(12) United States Patent
Jeong et al.

(10) Patent No.: US 11,068,029 B2
(45) Date of Patent: Jul. 20, 2021

(54) FLEXIBLE DISPLAY APPARATUS

(71) Applicant: LG Display Co., Ltd., Seoul (KR)

(72) Inventors: Hae-Yong Jeong, Paju-si (KR); Dong-Soo Shin, Gwangju (KR)

(73) Assignee: LG DISPLAY CO., LTD., Seoul (KR)

(*) Notice: Subject to any disclaimer, the term of this patent is extended or adjusted under 35 U.S.C. 154(b) by 96 days.

(21) Appl. No.: 16/600,078

(22) Filed: Oct. 11, 2019

(65) Prior Publication Data
US 2020/0174526 A1 Jun. 4, 2020

(30) Foreign Application Priority Data
Nov. 29, 2018 (KR) .................. 10-2018-0150811

(51) Int. Cl.
| | | |
|---|---|---|
| H01L 27/14 | (2006.01) | |
| H01L 29/04 | (2006.01) | |
| H01L 29/15 | (2006.01) | |
| H01L 31/036 | (2006.01) | |
| G06F 1/16 | (2006.01) | |
| G09F 9/30 | (2006.01) | |

(52) U.S. Cl.
CPC .......... *G06F 1/1652* (2013.01); *G06F 1/1626* (2013.01); *G09F 9/301* (2013.01)

(58) Field of Classification Search
USPC .......................................... 257/72
See application file for complete search history.

(56) References Cited

U.S. PATENT DOCUMENTS

| | | | |
|---|---|---|---|
| 10,342,133 B2* | 7/2019 | Kawata .................. | H05K 1/148 |
| 10,388,713 B2* | 8/2019 | Son ........................ | H01L 27/323 |
| 10,520,762 B2* | 12/2019 | Jung ................... | G02F 1/133308 |
| 10,802,629 B2* | 10/2020 | Jeon ..................... | G06F 1/1656 |

* cited by examiner

*Primary Examiner* — Niki H Nguyen
(74) *Attorney, Agent, or Firm* — Birch, Stewart, Kolasch & Birch, LLP

(57) ABSTRACT

A flexible display apparatus includes a flexible substrate including an active area and an inactive area, the inactive area including a first area disposed adjacent to the active area, a second area where a circuit board is disposed, and a bending area disposed between the first area and the second area, a first support layer disposed beneath the active area and the first area, and a second support layer disposed beneath the second area, and a guide disposed at a lower surface of the flexible substrate. The guide includes a first section and a second section. The first section is on a lower surface of the first support layer. The second section is disposed to cover a portion of the substrate that extends from the bending area. Accordingly, defects generated during bezel bending are reduced.

20 Claims, 17 Drawing Sheets

FLEXIBLE DISPLAY APPARATUS

CROSS-REFERENCE TO RELATED APPLICATION

This application claims the priority benefit of Korean Patent Application No. 10-2018-0150811 filed on Nov. 29, 2018 in the Korean Intellectual Property Office, the disclosure of which is hereby incorporated by reference in its entirety as if fully set forth herein.

BACKGROUND OF THE INVENTION

Field of the Invention

The present disclosure relates to a display apparatus, and more particularly to a display apparatus including a flexible display panel.

Discussion of the Related Art

In recent years, with the advent of the information age, the field of displays to visually express electrical information signals has rapidly developed. As such, a variety of display apparatuses having superior performance such as slimness, lightness and low power consumption have rapidly been developed.

Representative examples of such display apparatuses can include liquid crystal display (LCD) apparatuses, organic light emitting display (OLED) apparatuses, quantum dot display apparatuses, and the like.

Such a display apparatus can include a display panel, and a plurality of components for providing various functions. For example, one or more display driving circuits for controlling the display panel can be included in a display assembly. Examples of such display driving circuits can include gate drivers, light emission (source) drivers, electric power (VDD) routing circuits, electrostatic discharge (ESD) circuits, multiplexing (MUX) circuits, data signal lines, cathode contacts and other functional elements. A plurality of peripheral circuits for providing various kinds of additional functions, for example, a touch sensing function and a fingerprint identification function can also be included in the display assembly. Certain components can be disposed on the display panel. Certain components can be disposed in peripheral areas around a display area, which are often referred to as a "non-display area" and/or an "inactive area" or a "non-active area" in the present disclosure.

Important factors in display design of modern display apparatuses are size and weight. Sometimes, it can be most important to increase the ratio of the size of an active area to the size of an inactive area, which is referred to as a "screen-to-bezel ratio". However, when a part of the above-mentioned components is disposed within the display assembly, a large inactive area, which can occupy a considerable portion of the display panel, can be needed. Such a large inactive area can cause the display panel to have a large size. In this case, it can be difficult to incorporate the display panel in a housing of the display apparatus. Furthermore, the large inactive area can require great masking (for example, a bezel enclosure or a covering material) in order to cover a considerable portion of the display panel and, as such, the display apparatus can have poor aesthetics.

Certain components can be disposed on a separate flexible printed circuit board (FPC) and, as such, can be disposed at a backplane of the display panel. In spite of such a configuration, however, components essentially required for panel driving such as interfaces for connecting lines between the FPC and the active area and a driver IC are still disposed in the inactive area and, as such, reduction of bezel size is still limited.

SUMMARY OF THE INVENTION

Accordingly, the present disclosure is directed to a flexible display apparatus that substantially obviates one or more problems due to limitations and disadvantages of the related art.

The inventors of the present disclosure recognized that various highly-advanced technologies associated with line position and line width, signal transfer method, etc. are required for realization of a narrow bezel exhibiting a reduced inactive area ratio. Therefore, the inventors of the present disclosure conducted research into various designs using flexibility characteristics of a display apparatus, to which a flexible substrate is applied. As a result, the inventors of the present disclosure invented a flexible display apparatus having a new structure capable of minimizing a non-display area other than an active area to display an image, for example, an inactive area.

For example, it can be desirable to increase the ratio of an active area by bending a portion of a display panel in order to manufacture a display apparatus having a smaller and lighter structure through reduction in the ratio of an inactive area. This can be achieved by disposing a part of the inactive area behind the active area of the display panel such that the inactive area, which should be hidden by a masking or a device housing disposed thereover, is reduced or eliminated.

An object of the present disclosure is to provide a flexible display apparatus capable of minimizing the size of an inactive area to be visually hidden through bending of a flexible substrate thereof, thereby achieving realization of a narrow-bezel or bezel-free display apparatus while achieving realization of an advanced design.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a display apparatus includes a flexible substrate including an active area and an inactive area, the inactive area including a first area disposed adjacent to the active area, a second area where a circuit board is disposed, and a bending area disposed between the first area and the second area, a first support layer disposed beneath the active area and the first area, and a second support layer disposed beneath the second area, and a guide disposed at a lower surface of the flexible substrate, the guide including a first section and a second section, wherein the first section is bonded to a lower surface of the first support layer, and the second section is disposed to cover a portion of the substrate bent by or that extends from the bending area.

In another embodiment of the present disclosure, a flexible display apparatus includes a substrate including a display area and a non-display area, a component formation part disposed at a portion of the non-display area, a first support layer disposed at a lower surface of the display area, a circuit board disposed at a surface of the component formation part, and a structure bonded to the surface of the first support layer while being disposed to cover at least a portion of the component formation part, the structure supporting the substrate in a non-fixing state.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and along with the description serve to explain the principle of the disclosure. In the drawings.

DETAILED DESCRIPTION OF THE EMBODIMENTS

Figure 1:
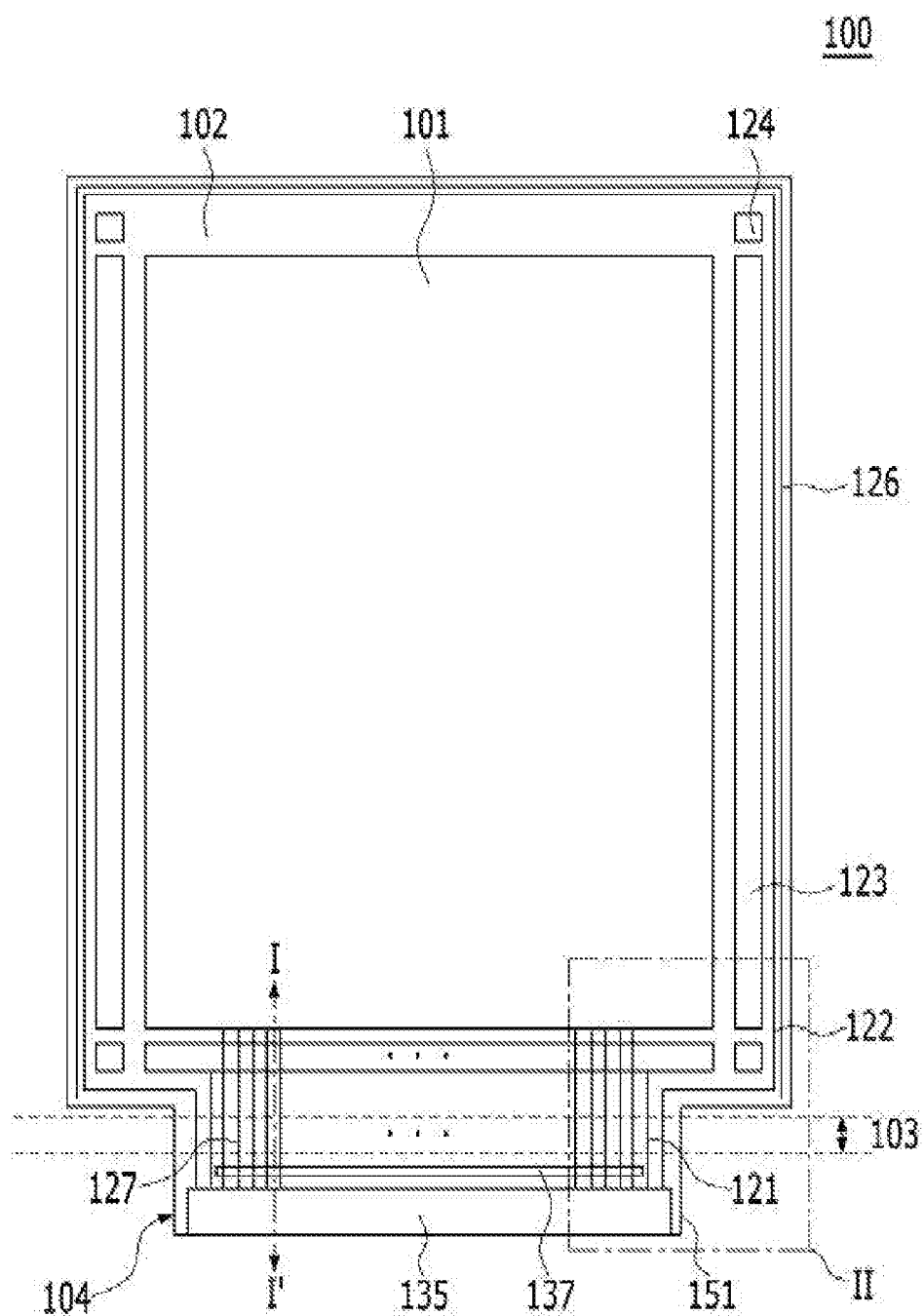
FIG. 1 is a view illustrating a layout of a display panel according to an embodiment of the present disclosure.

Reference will now be made in detail to embodiments, examples of which are illustrated in the accompanying drawings. However, the present disclosure can be embodied in many different forms and should not be construed as limited to the embodiments set forth herein. Rather, these embodiments are provided so that this disclosure will be thorough and complete, and will fully convey the scope of the disclosure to those skilled in the art. The present disclosure is defined only by the categories of the claims.

The shape, size, ratio, angle, number and the like shown in the drawings to illustrate the embodiments of the present disclosure are only for illustration and are not limited to the contents shown in the drawings. Wherever possible, the same reference numbers will be used throughout the drawings to refer to the same or like parts. In the following description, detailed descriptions of technologies or configurations related to the present disclosure can be omitted so as not to unnecessarily obscure the subject matter of the present disclosure. When terms such as "including", "having" and "comprising" are used throughout the specification, an additional component can be present, unless "only" is used. A component described in a singular form encompasses components in a plural form unless particularly stated otherwise.

It should be interpreted that the components included in the embodiment of the present disclosure include an error range, although there is no additional particular description thereof.

In describing a variety of embodiments of the present disclosure, when terms for positional relationships such as "on", "above", "under" and "next to" are used, at least one intervening element can be present between two elements unless "right" or "direct" is used.

In describing a variety of embodiments of the present disclosure, when a temporal relationship is described, for example, when terms for temporal relationship of events such as "after", "subsequently", "next", and "before" are used, there can also be the case in which the events are not continuous, unless "immediately" or "directly" is used.

In the meantime, although terms including an ordinal number, such as first or second, can be used to describe a variety of constituent elements, the constituent elements are not limited to the terms, and the terms are used only for the purpose of discriminating one constituent element from other constituent elements. For example, without departing from the scope of the present disclosure, a first constituent element can be named a second constituent element.

It will be understood that, although the terms first, second, A, B, (a), (b), etc. can be used herein to describe various elements of the present disclosure, these terms are only used to distinguish one element from another element and necessity, order, or sequence of corresponding elements are not limited by these terms. It will be understood that when one element is referred to as being "connected to", "coupled to", or "accessed by" another element, one element can be "connected to", "coupled to", or "accessed by" another element via a further element although one element can be directly connected to or directly accessed by another element.

In the present disclosure, "display apparatus" can include, in a narrow sense, display apparatuses such as a liquid crystal module (LCM) including a display panel and a driver for driving the display panel, an organic light emitting display (OLED) module, and a quantum dot (QD) module. In addition, the display apparatus can also include equipment displays including complete products or final products of LCM, OLED, and QD modules, for example, a notebook computer, a television, a computer monitor, an automotive display, or other displays for vehicles, and set electronic devices or set devices (set apparatuses) such as mobile electronic devices, for example, a smart phone and a tablet.

Accordingly, the display apparatus in the present disclosure can include application products or set apparatuses, as final products for consumers, including LCM, OLED, and QD modules as well as display apparatuses such as LCM, OLED, and QD modules.

If necessary, LCM, OLED, and QD modules, which include a display panel, a driver, etc., can be expressed, in a narrow sense, as display apparatuses, and electronic devices of final products including LCM, OLED, and QD modules can be expressed as set apparatuses. For example, such a display apparatus in a narrow sense can include a display panel constituted by an LCM, OLED, or QD module, and a source printed circuit board (source PCB) as a controller for driving the display panel. Meanwhile, such a set apparatus can include a set PCB as a set controller, which is connected to a source PCB, so as to control the entirety of the set apparatus.

As a display panel used for embodiments of the present disclosure, all types of display panels, for example, a liquid crystal display panel, an organic light emitting diode (OLED) display panel, a quantum dot display panel, an electroluminescent display panel, etc. can be used. Of course, the display panel is not limited to a particular display panel including a flexible substrate for an OLED display panel and a backplane support structure disposed beneath the display panel, thereby being capable of achieving bezel bending. The display panel used in a display apparatus according to an embodiment of the present disclosure is not limited in shape and size.

In more detail, when the display panel is an OLED display panel, the display panel can include a plurality of gate lines, a plurality of data lines, and a plurality of pixels provided in respective intersections between the gate lines and the data lines. In addition, the display panel can further include an array including thin film transistors as devices for selectively applying a voltage to the pixels, an OLED layer disposed on the array, and an encapsulation substrate or an encapsulation layer disposed on the array, to cover the OLED layer. The encapsulation layer protects the thin film transistors and the OLED layer from external impact. Layers formed on the array can include an inorganic light emitting layer, for example, a nano-scale material layer or a quantum dot layer, and the like.

There can be problems to be solved upon providing a flexible display panel.

Various components should be disposed immediately on a flexible substrate, together with display pixels. When a thin substrate is used for flexibility of the flexible substrate, the components can be weakened due to various mechanical stresses possibly generated during manufacture of the product and/or use of the product after completion of manufacture thereof. In particular, mechanical stress caused by bending of the flexible display panel can adversely affect reliability of the product or can further cause failure of completed components. For example, components such as a high-level voltage (VDD) line, a low-level voltage (VSS) line, and data signal lines formed in a bending area after extending from an inactive area can be subjected to both tension stress and shrinkage stress (or compression stress) generated in the bending area during a bending process for bending the flexible substrate, a process of attaching a flexible printed circuit board (FPCB) or a data driver to the flexible substrate after completion of the bending process, or a process of coupling the manufactured display panel to a module of the display apparatus after completion of attachment. As a result, the VDD line, the VSS line or the data signal lines can be short-circuited or can have cracks. In the following description, the area where the flexible substrate is bent will be defined as a bending area or a bending portion.

In order to protect components from various stresses possibly generated as described above, a protective film having an organic property can be formed over the bending area. In a representative example, an organic film called a "microcoating layer (MCL)" can be disposed over the components in the bending area in order to avoid penetration of moisture into the components from the outside. The organic film can also function to allow various lines present in the bending area to be positioned near a neutral plane during a bending process and, as such, tension stress and shrinkage stress possibly applied to the lines can be reduced. If there is no microcoating layer, the components in the bending area can be exposed to the outside. As a result, the components can be exposed to physical impact, moisture and oxygen and, as such, can be chemically deformed. Furthermore, tension stress, which causes an increase in surface area at a top side, as compared to other sides, can be strongly applied to various components disposed at the uppermost side. Short circuit or partial cracking caused by the tension stress can function as a critical defect and, as such, can cause poor driving of the display panel. It can be possible to provide a structure having reduced defects by disposing a microcoating layer to protect various lines in the bending area, thereby absorbing physical/chemical impact possibly applied to the lines, enabling the lines to be disposed near a neutral plane in the overall laminated structure including the substrate and the microcoating layer in accordance with disposition of the microcoating layer, and absorbing tension stress and shrinkage stress by the microcoating layer in accordance with an organic property of the microcoating layer.

An adhesive layer can be disposed at a lower surface of the substrate in order to fix, to the substrate, an inactive area of the display panel disposed to face the lower surface of the substrate in a 180°-folded or bent state of the display panel according to a bending process. Accordingly, the inactive area of the display panel, which has been folded toward a lower surface of the display panel, can be bonded to the substrate, together with the microcoating layer, and, as such, relative movement of the elements can be impossible. That is, a bending area of the display panel can be maintained in a fixed state by virtue of the adhesive layer. However, the bending area can be struck by an external construction having high hardness or can come into contact with a sharp portion of a module of the display apparatus such as a corner during a process of assembling the module due to carelessness of the operator performing the process. In this case, stress is concentrated on the bending area because the inactive area, which is fixed to the substrate by the adhesive layer, cannot transfer impact to other parts. As a result, the bending area can be locally deformed and, as such, can be recessed in an inward radial direction of the bending area. Otherwise, the microcoating layer can be stripped or can become loose.

In association with realization of a narrow-bezel or bezel-free display apparatus as described above, therefore, it can be important to realize a method capable of transferring external force, to which a bending area can be possibly subjected, to other constructions, while maintaining the bending structure without being inconsistent with thinness and lightness as a tendency of currently developed display apparatuses. To this end, the inventors of the present disclosure invented a flexible display apparatus having a new structure capable of reducing stress generated during bending while preventing short circuit or breakage of components. This will be described hereinafter.

In the present disclosure, FIG. 1 illustrates an OLED display panel 100 which can be embodied in display apparatuses. All elements and components of the OLED display panel 100 are operationally coupled and configured.

Figure 2:
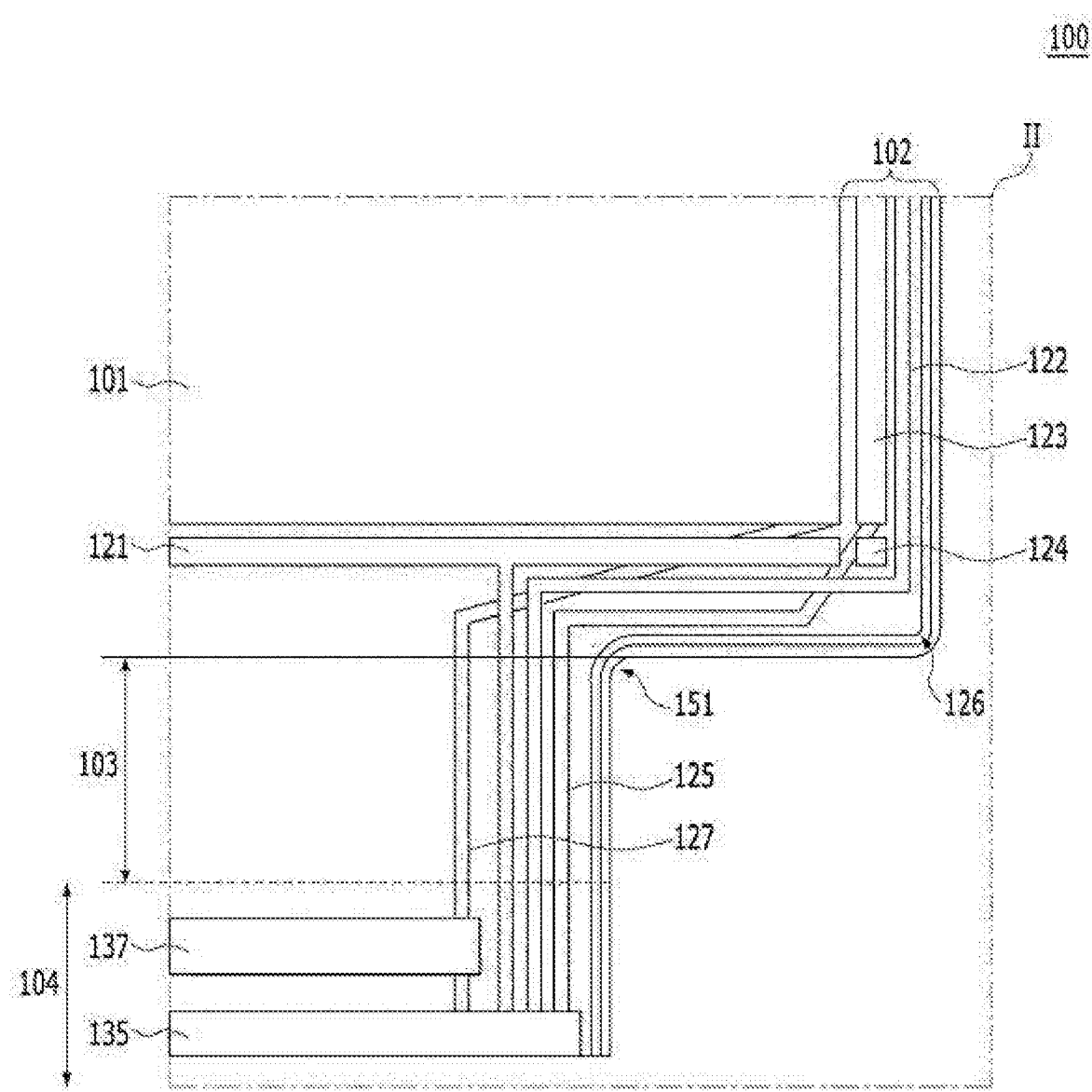
FIG. 2 is an enlarged view corresponding to an area II in FIG. 1.
Figure 3:
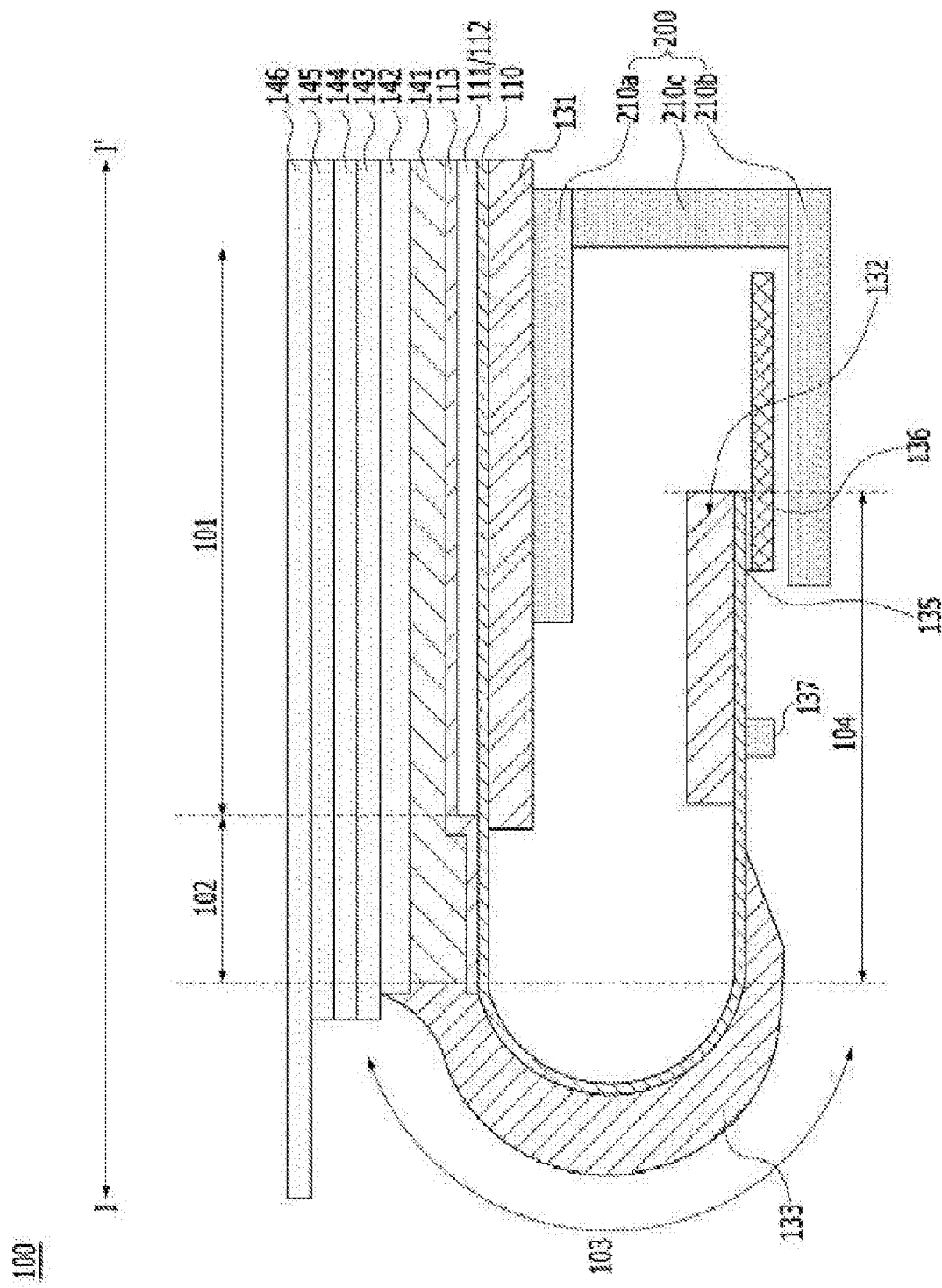
FIG. 3 is a cross-sectional view taken along line I-I' of FIG. 1.
Figure 4:
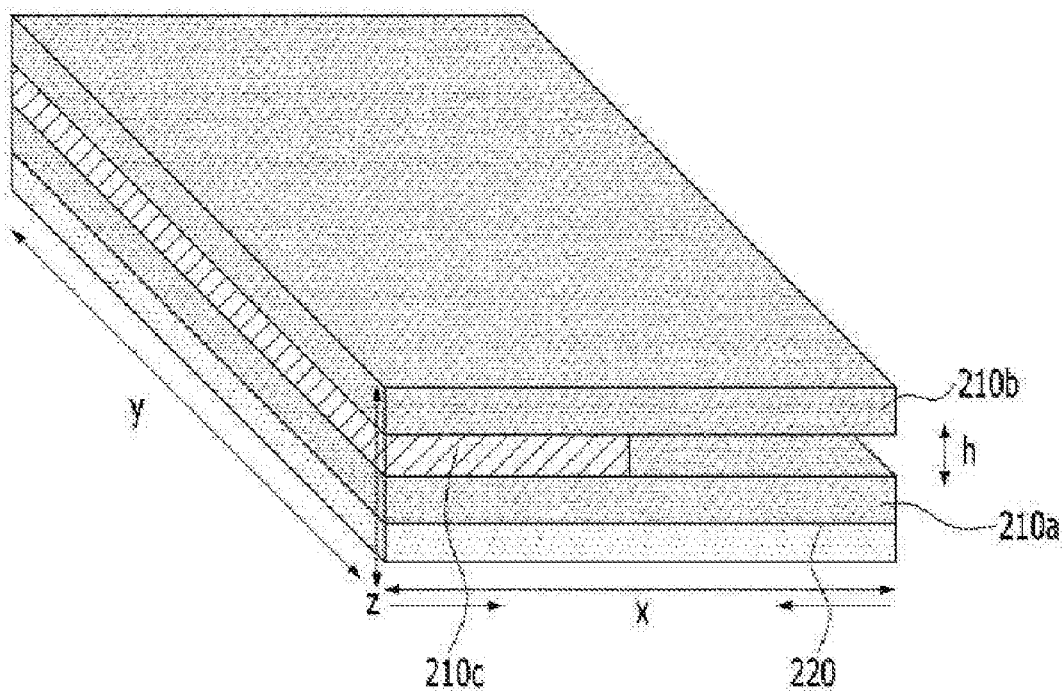
FIG. 4 is a view illustrating a guide structure according to an embodiment of the present disclosure.
Figure 5A:
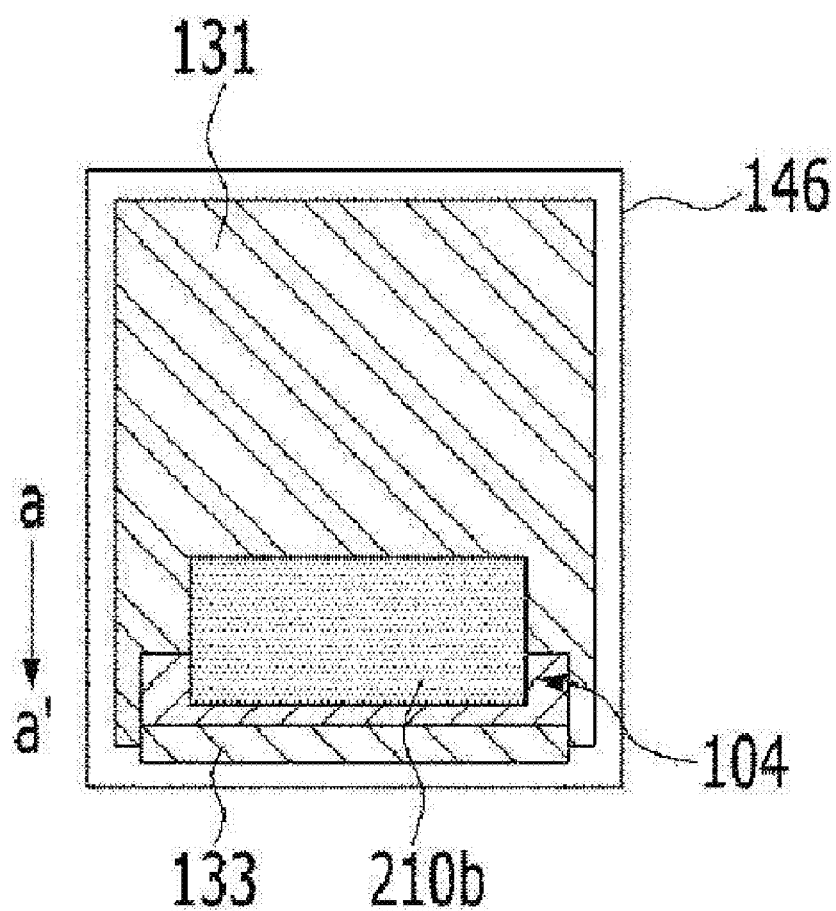
FIG. 5A is a plan view illustrating a lower surface of a display panel according to an embodiment of the present disclosure.
Figure 5B:
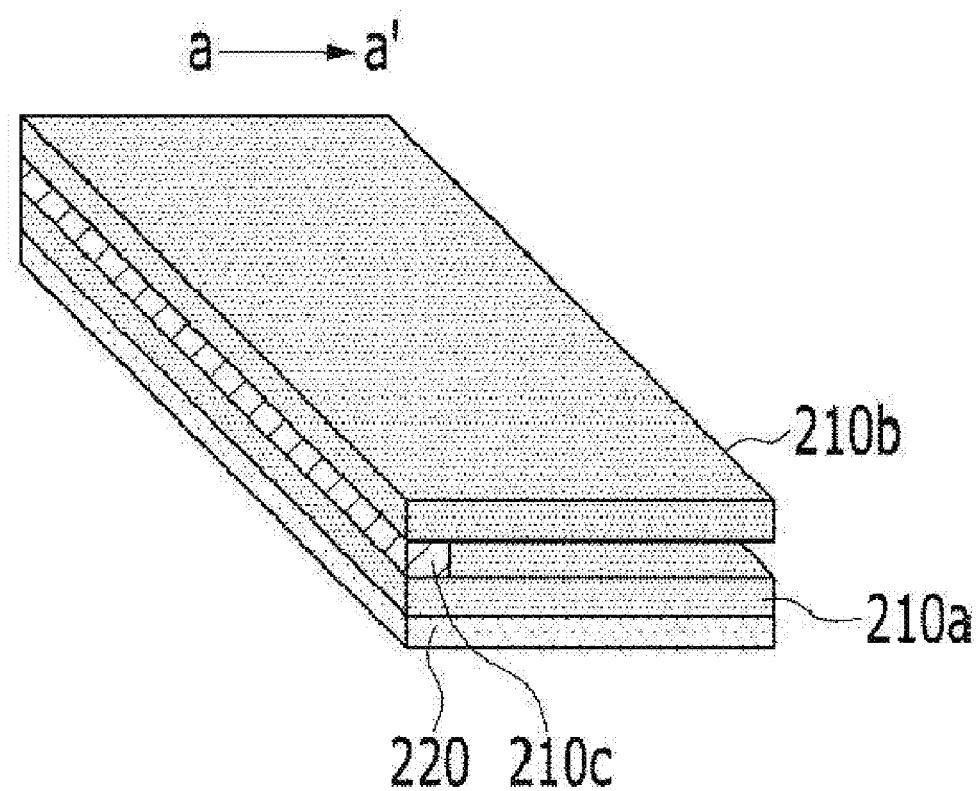
FIG. 5B is a view illustrating a guide structure of FIG. 5A.
Figure 6A:
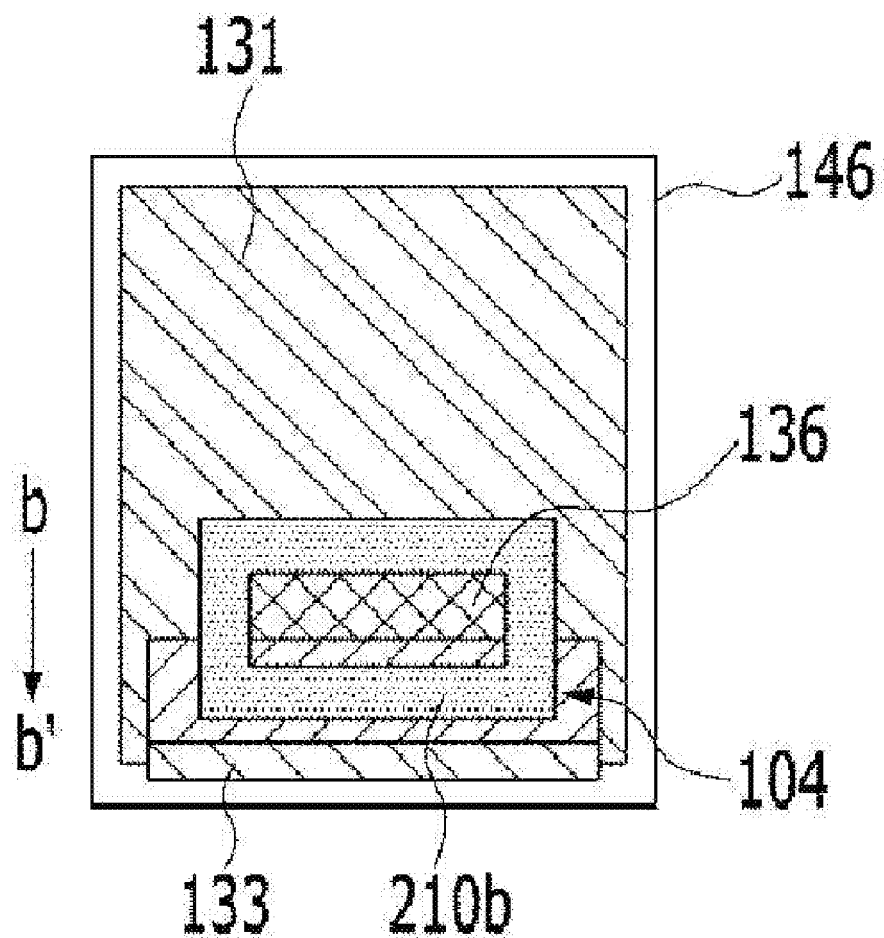
FIG. 6A is a plan view illustrating a lower surface of a display panel according to another embodiment of the present disclosure.
Figure 6B:
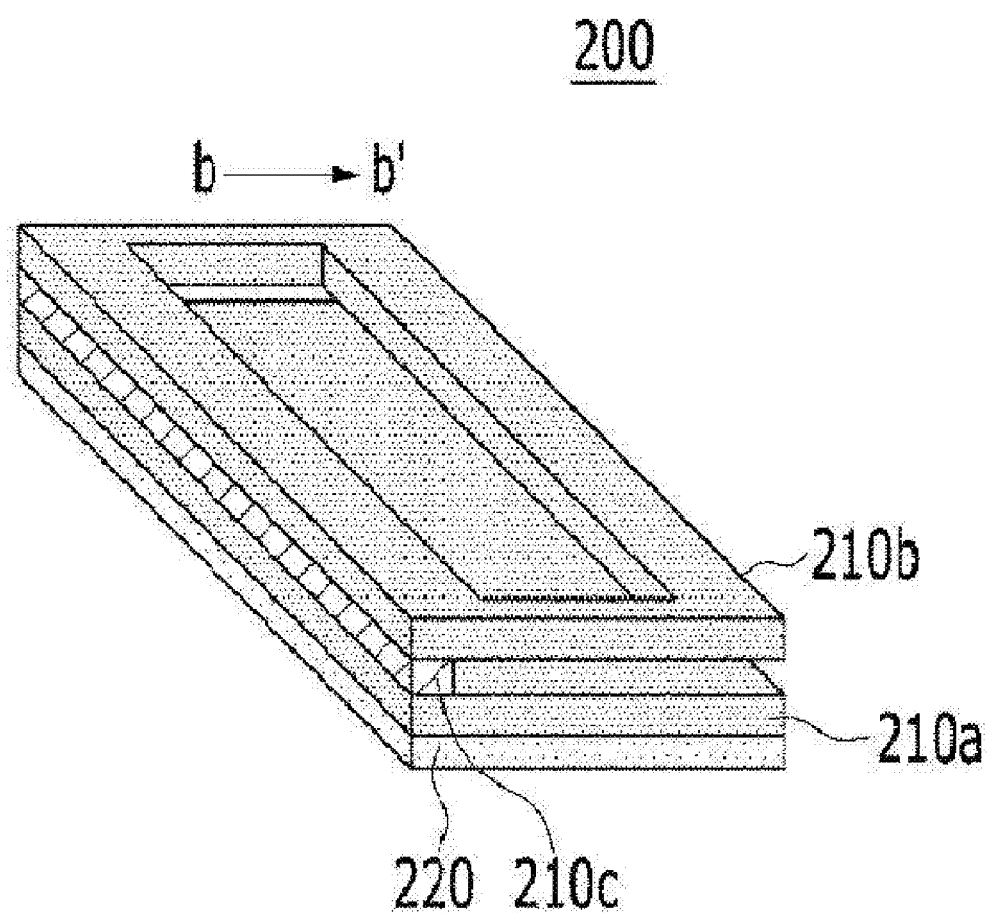
FIG. 6B is a view illustrating a guide structure of FIG. 6A.
Figure 7A:
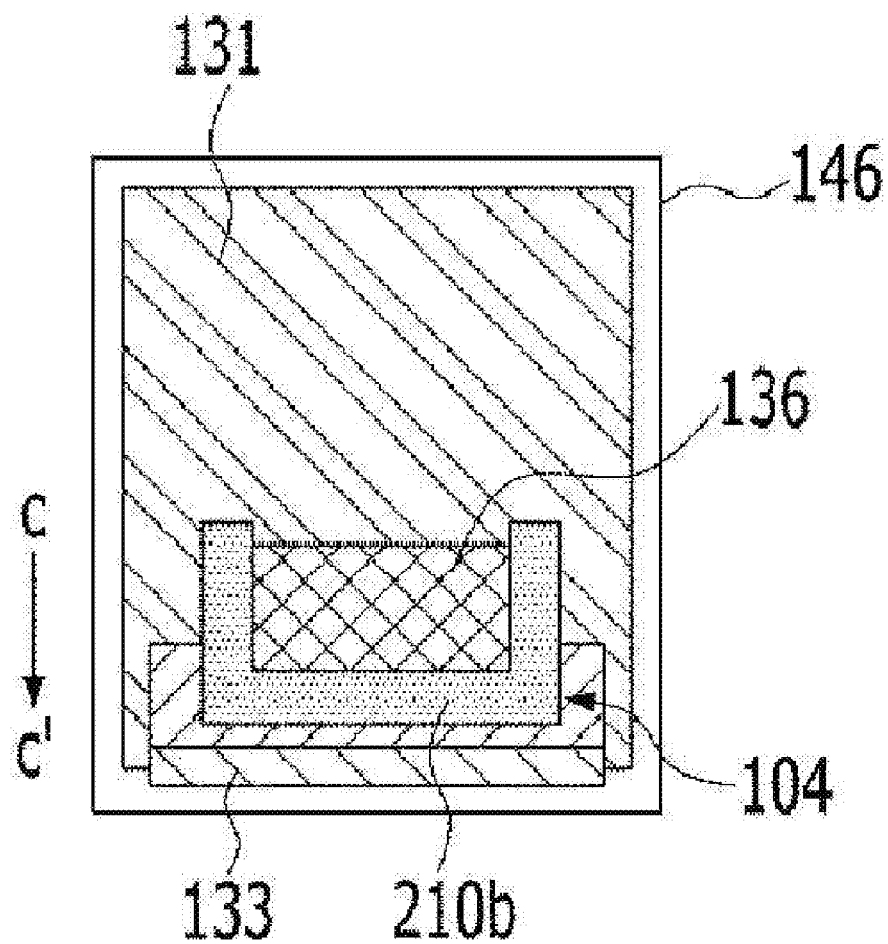
FIG. 7A is a plan view illustrating a lower surface of a display panel according to another embodiment of the present disclosure.
Figure 7B:
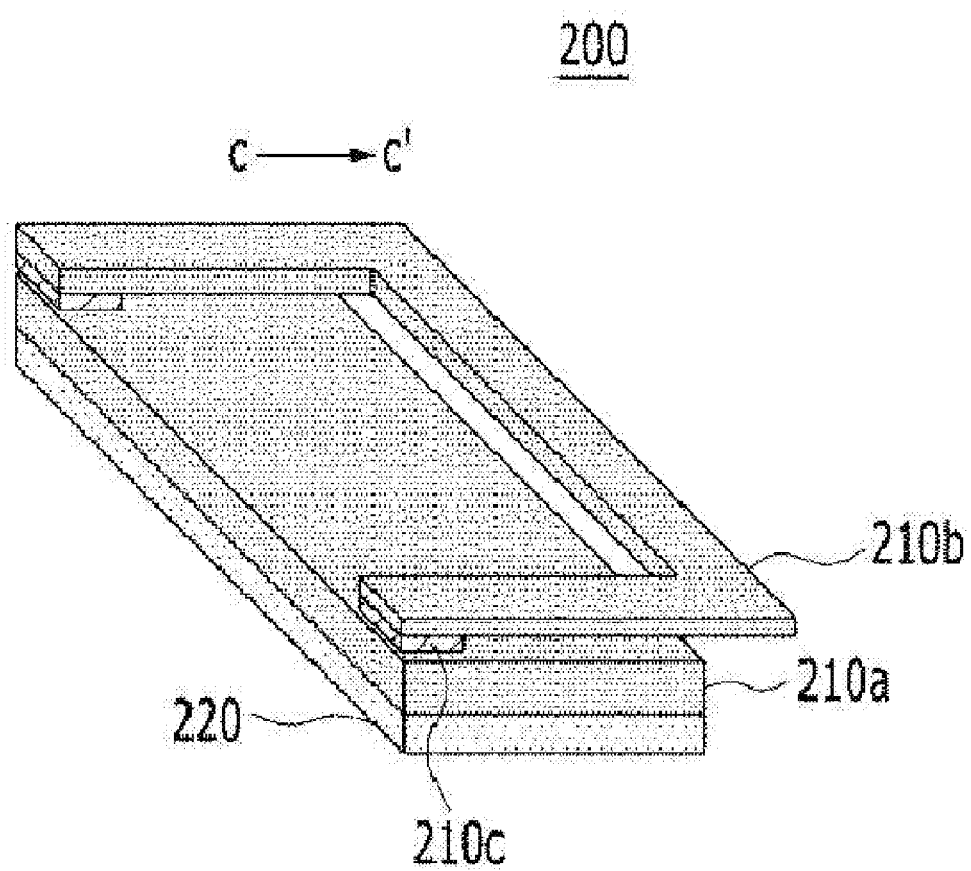
FIG. 7B is a view illustrating a guide structure of FIG. 7A.
Figure 8A:
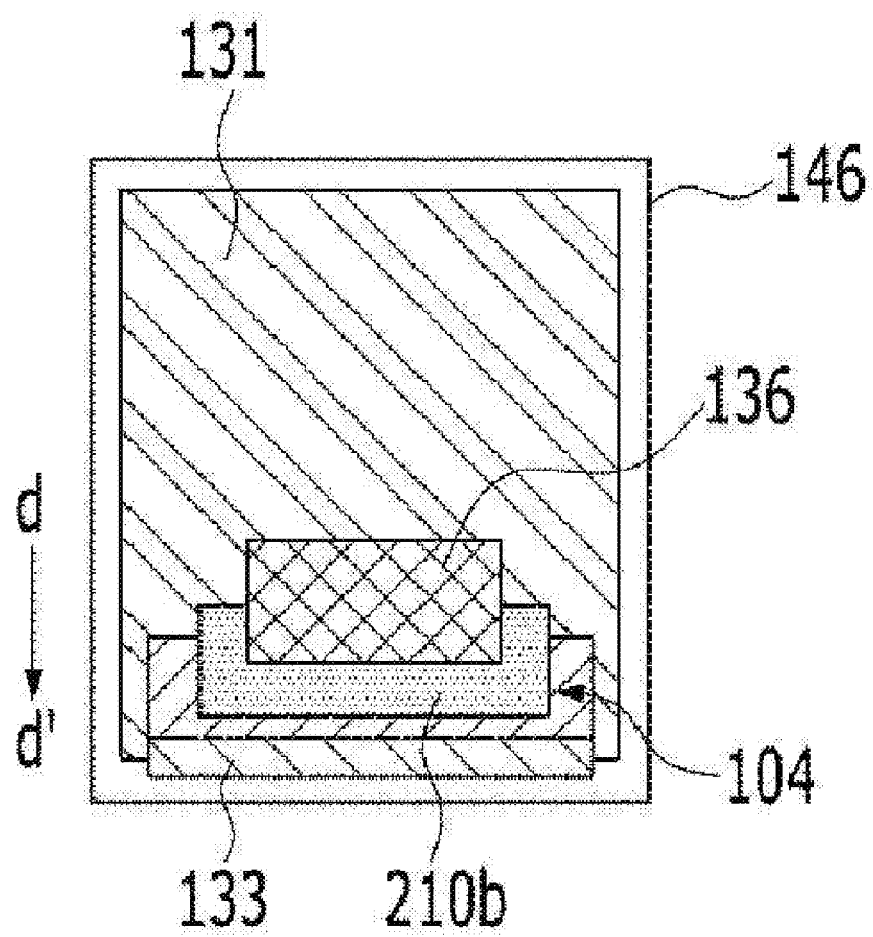
FIG. 8A is a plan view illustrating a lower surface of a display panel according to another embodiment of the present disclosure.
Figure 8B:
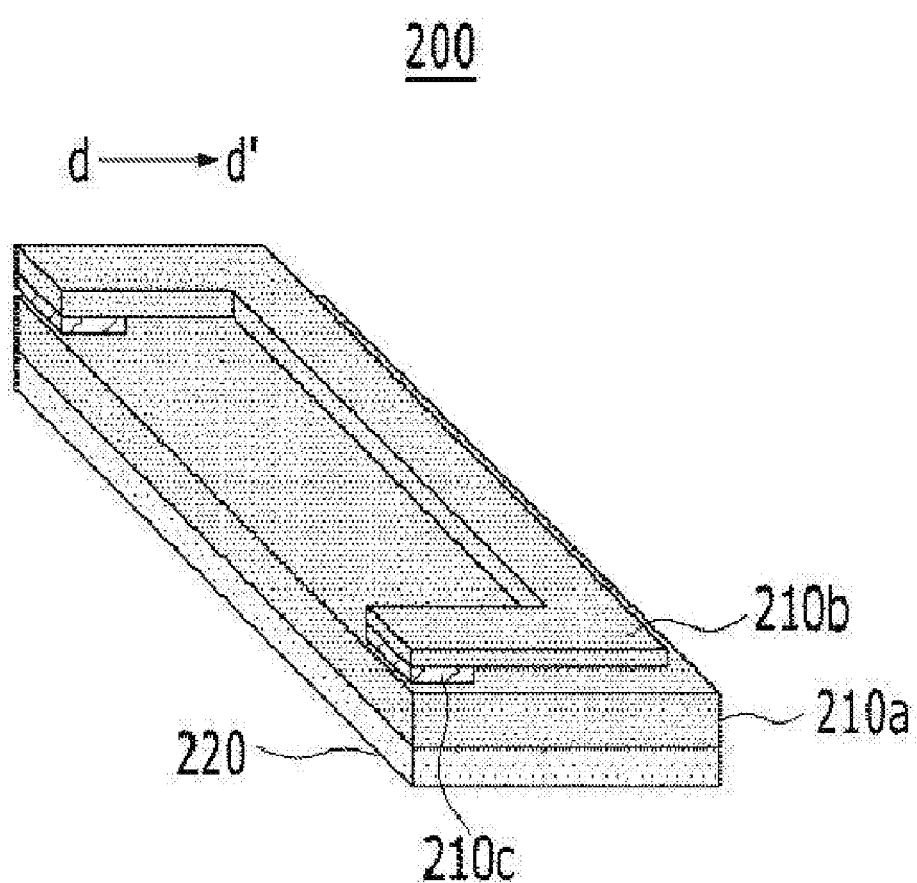
FIG. 8B is a view illustrating a guide structure of FIG. 8A.
Figure 9A:
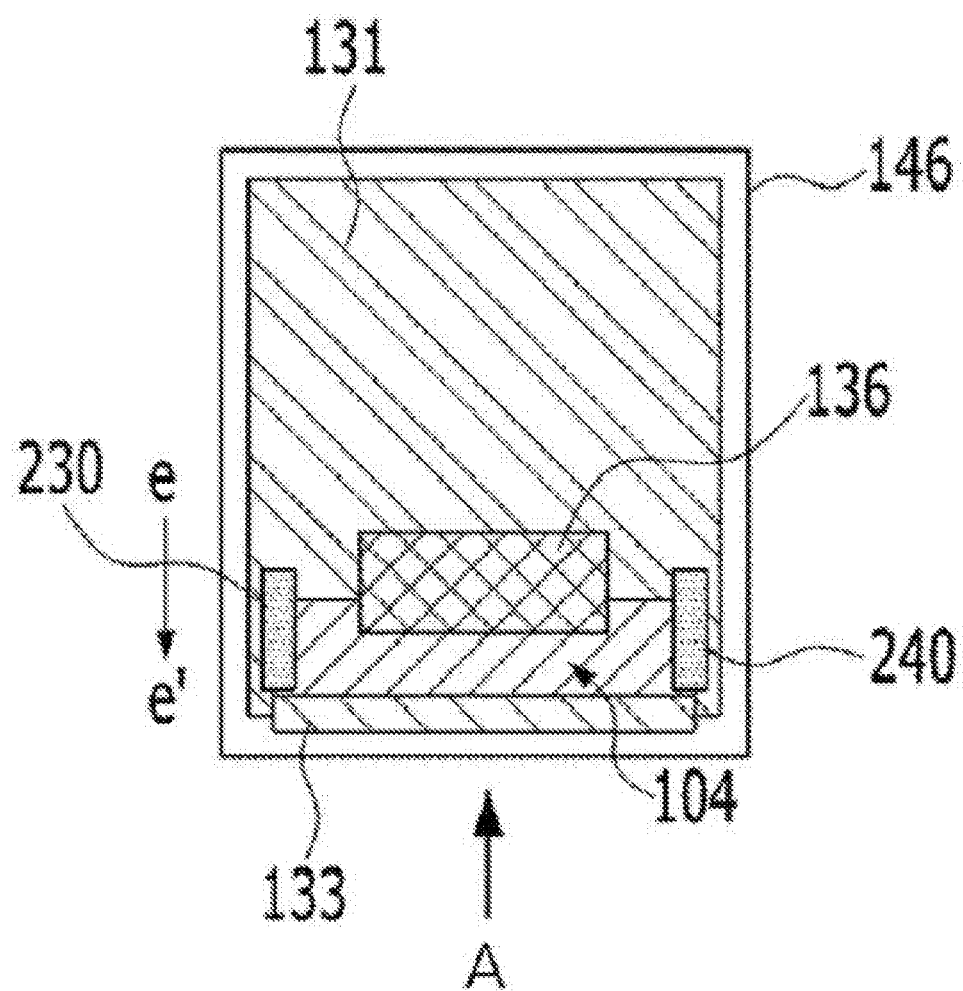
FIG. 9A is a plan view illustrating a lower surface of a display panel according to another embodiment of the present disclosure.
Figure 9B:
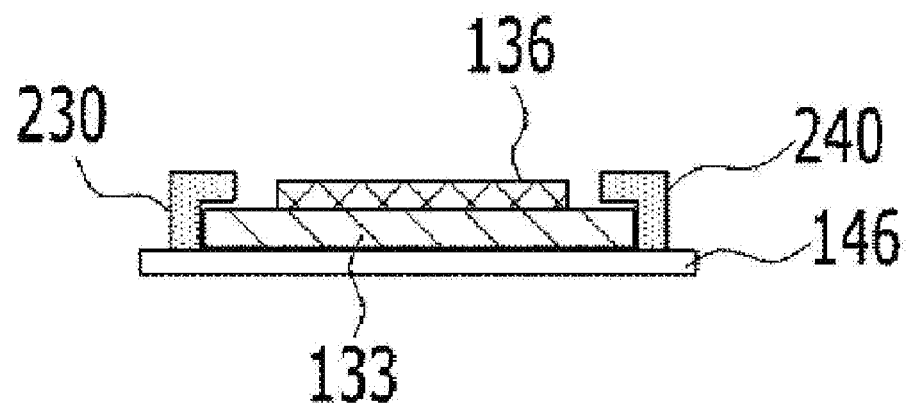
FIG. 9B is a side view illustrating the display panel of FIG. 9A.
Figure 10A:
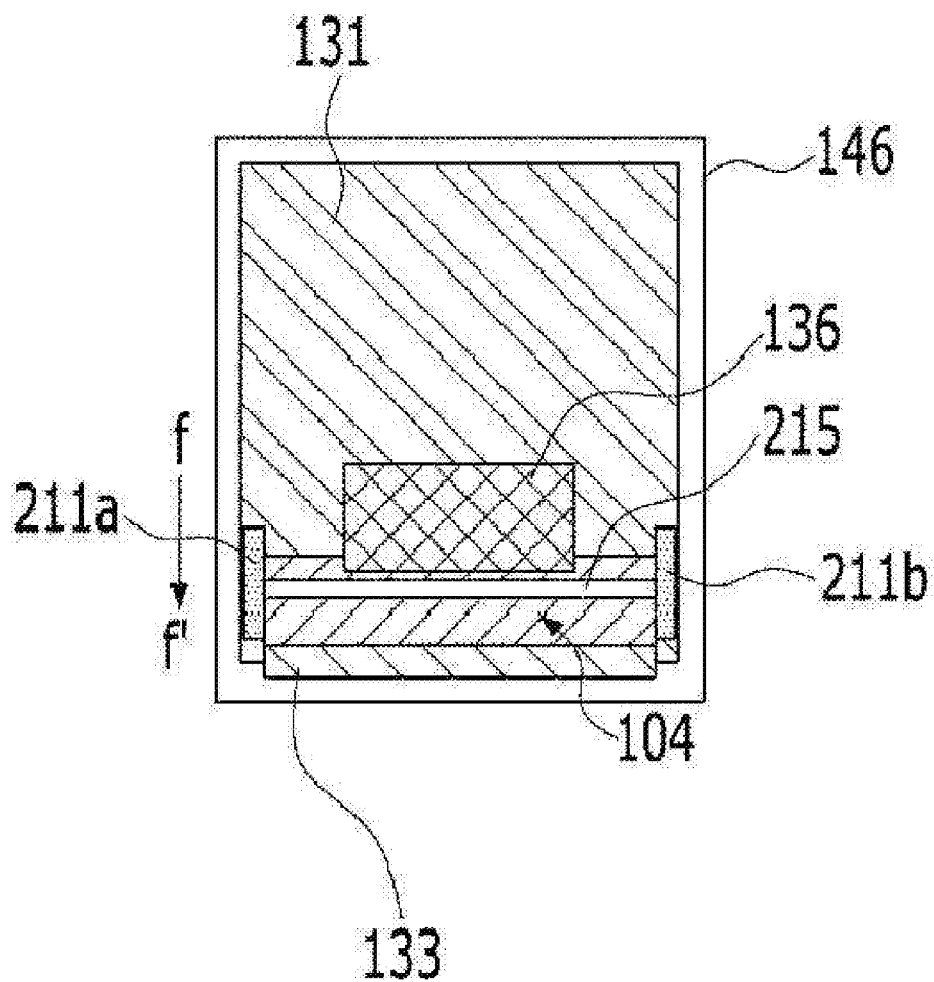
FIG. 10A is a plan view illustrating a lower surface of a display panel according to another embodiment of the present disclosure.
Figure 10B:
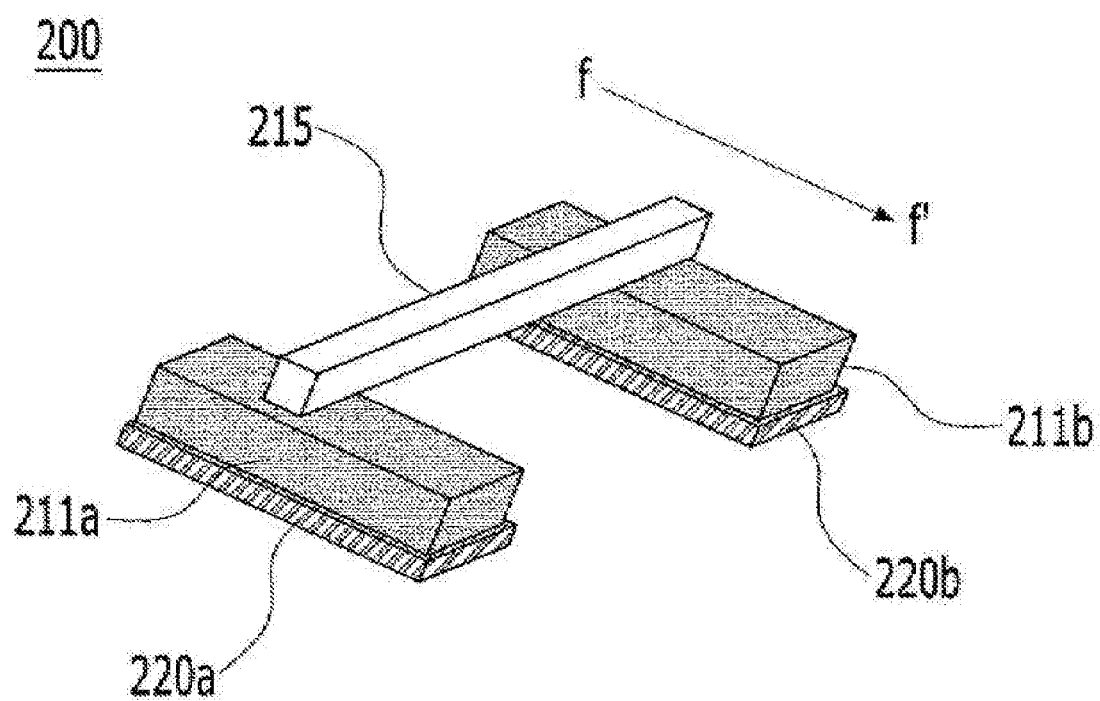
FIG. 10B is a view illustrating a guide structure of FIG. 10A.
Figure 11A:
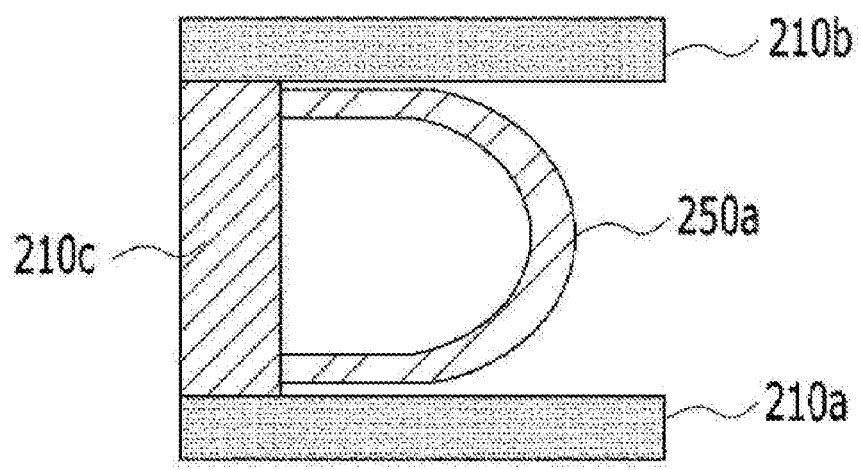
FIG. 11A is a cross-sectional view illustrating a guide structure according to an embodiment of the present disclosure.
Figure 11B:
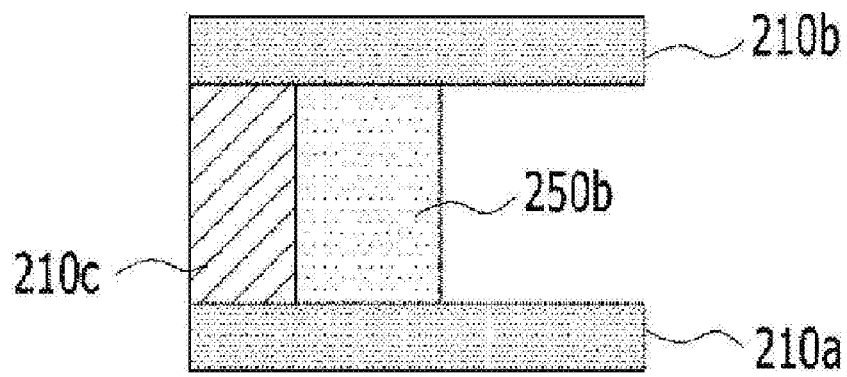
FIG. 11B is a cross-sectional view illustrating a guide structure according to another embodiment of the present disclosure.

FIG. 1 is a view illustrating a layout of a display panel according to an embodiment of the present disclosure. FIG. 2 is an enlarged plan view corresponding to an area II indicated by a dash-dotted line in FIG. 1, to show disposition of components around a notch area. FIG. 3 is a cross-sectional view taken along line I-I' of FIG. 1, to show a structure of a flexible substrate of FIG. 1 folded through bending. FIG. 4 is an enlarged three-dimensional view of a guide structure illustrated in FIG. 3, to show a three-dimensional shape of the guide structure. FIG. 5A is a plan view illustrating a lower surface of a display panel, at which a guide structure according to an embodiment is disposed. FIG. 5B is a view illustrating a three-dimensional shape of the guide structure of FIG. 5A. FIG. 6A is a plan view illustrating the lower surface of the display panel, at which a guide structure according to another embodiment is disposed. FIG. 6B is a view illustrating a three-dimensional shape of the guide structure of FIG. 6A. FIG. 7A is a plan view illustrating the lower surface of the display panel, at which a guide structure according to another embodiment is disposed. FIG. 7B is a view illustrating a three-dimensional shape of the guide structure of FIG. 7A. FIG. 8A is a plan view illustrating the lower surface of the display panel, at which a guide structure according to another embodiment is disposed. FIG. 8B is a view illustrating a three-dimensional shape of the guide structure of FIG. 8A. FIG. 9A is a plan view illustrating the lower surface of the display panel, at which a guide structure according to another embodiment is disposed. FIG. 9B is a view illustrating a three-dimensional shape of the guide structure of FIG. 9A. FIG. 10A is a plan view illustrating the lower surface of the display panel, at which a guide structure according to another embodiment is disposed. FIG. 10B is a view illustrating a three-dimensional shape of the guide structure of FIG. 10A. FIG. 11A is a cross-sectional view illustrating disposition of an impact absorbing member in the guide structure according to an embodiment. FIG. 11B is a cross-sectional view illustrating disposition of an impact absorbing member in the guide structure according to another embodiment.

FIG. 1 illustrates the OLED display panel 100 which can be embodied in display apparatuses in the present disclosure. Referring to FIG. 1, the OLED display panel 100 can include at least one active area 101 in which light emitting elements 112 (FIG. 3) and arrays 111 (FIG. 3) are formed.

The display panel 100 can include inactive areas disposed around the active area 101. The inactive areas can include a first inactive area 102 disposed at upper, lower, left and right sides of the active area 101, and a second inactive area 104 disposed opposite to the active area 101 with reference to a bending area. The active area 101 can have a rectangular shape, without being limited thereto. For example, various display apparatuses having circular, oval and polygonal shapes can be applied to display apparatuses for a smartwatch and a vehicle. Therefore, arrangement of the first inactive area 102 and the second inactive area 104 surrounding the active area 101 is not limited to that of the OLED display panel 100 illustrated in FIG. 1. In association with the OLED display panel 100 illustrated in FIG. 1, various components associated with driving of the light emitting elements 112 and the arrays 111 formed in the active area 101 are disposed in the first inactive area 102 positioned adjacent to the active area 101, to provide functions for light emission. For example, disposed in the first inactive area 102 can be circuits such as gate-in-panels (GIPs) 123 and electrostatic discharge (ESD) protection circuits 124, an area for providing contact between a cathode as a part of each light emitting element and a line 122 for a low-level voltage as a reference voltage of the light emitting element, and an encapsulation layer 113 for protecting the light emitting element 112 from moisture or foreign matter penetrating from the outside. In addition, disposed in the first inactive area 102 can be a plurality of dam structures for preventing the material of a foreign matter compensation layer included in the encapsulation layer 113 from overflowing beyond the display panel 100 during a process of coating the foreign matter compensation layer and a crack stopper structure for preventing cracks generated during a scribing process for dividing a mother substrate into individual display panels from being transferred to an inner portion of the display panel 100. The area where components are disposed, which is included in the first inactive area 102, can be referred to as a "first component formation part". The first component formation part can extend along a longer-axis surface of the active area 101, and can have an inclined surface in a bent state.

When impact generated at trimming lines of the substrate 110 during a scribing process reaches the GIPs 123, the ESD protection circuits 124 or the VSS lines 122 formed in the first inactive area 102, the GIPs 123, the ESD protection circuits 124 or the VSS lines 122 can break due to the impact. Furthermore, the impact can provide a moisture penetration path at the light emitting elements 112 or the arrays 111 formed in the active area 101, thereby causing growth of dark spots or occurrence of pixel shrinkage. In the present disclosure, the crack stopper structure 126 can prevent such phenomena occurring due to impact generated during a scribing process.

The crack stopper structure 126 can be constituted by an inorganic film or an organic film, or can have a multilayer structure of inorganic film/organic film, without being limited thereto. In FIG. 1, the crack stopper structure 126 is illustrated as being disposed at both longer sides and one shorter side of the display panel 100, without being limited thereto. For example, the crack stopper structure 126 can also be disposed in a bending area 103 and areas where notches 151 are formed, respectively, such that the crack stopper structure 126 is disposed at all peripheral portions of the substrate 110.

In an area disposed adjacent to the trimming line of the substrate 110 outside the crack stopper structure 126, insulating films (a gate insulating (GI) layer, a buffer layer, and the like) deposited over the entire upper surface of the substrate 110 upon forming the active area can be partially or completely etched such that the insulating films are left in a small amount on the upper surface of the substrate 110 or the upper surface of the substrate 110 is completely exposed, in order to prevent scribing impact from being transferred to the insulating films.

Referring to FIG. 1, similarly to the first inactive area 102, various components associated with driving of the light emitting elements 112 and the arrays 111 formed in the active area 101 are disposed in the second inactive area 104, to provide functions for stable light emission. For example, a circuit board 136 electrically connected to a pad 135 formed for reception of external electric power, a data driving signal, etc. and reception and transmission of a touch signal can be disposed in the second inactive area 104. A VDD line 121, a VSS line 122 and/or voltage lines 127 for data can also be disposed in the second inactive area 104. The voltage lines 127 for data can also be referred to as "data voltage lines".

In the present disclosure, the voltage lines 127 for data can be disposed to be connected to a data driver IC 137 for generating an emission signal for each light emitting element 112.

The area where the pad 135 and the data driver IC 137 as described above are disposed, which is included in the second inactive area 104, can be referred to as a "second component formation part". In the second component formation part, the VDD line 121 and the VSS line 122 can be partially disposed in the second component formation part.

Referring to FIG. 1, notches 151 can be disposed at the display panel 100 in accordance with an embodiment of the present disclosure, for bending of the bending area 103, as indicated by a dash-dotted line. The notches 151 can be formed by trimming opposite lower corners of the display panel 100.

For example, during execution of a scribing process for dividing a mother substrate into individual panels, trimming is carried out to proceed from vicinities of the opposite lower corner areas toward an inside of the first inactive area 102 such that trimmed surfaces are disposed adjacent to the VDD line 121 or the VSS line 122.

In the present disclosure, the notches 151 extend from one end of the flexible substrate 110 and, as such, a bending process can begin from the vicinities of the notches 151 and can end in the vicinity of the data driver IC 137. Accordingly, the area of the flexible substrate 110 where the data driver IC 137 and the circuit board pad 135 are disposed can face a lower surface of a portion of the flexible substrate 110 at which the active area is formed.

Members connected to the pad 135 formed at an upper surface of the display panel 100 are not limited to the circuit board 136. Various members can be connected to the pad 135. The pad 135 can also be disposed at the upper surface of the display panel 100 or a lower surface of the display panel 100.

Although the data driver IC 137 is illustrated in FIG. 1 as being disposed at the upper surface of the display panel 100, the position of the data driver IC 137 is not limited thereto. The data driver IC 137 can be disposed at the lower surface of the display panel 100. Furthermore, members disposed at the upper surface of the display panel 100 are not limited to the data driver IC 137.

FIG. 2 is an enlarged view corresponding to a portion II of FIG. 1. Referring to FIG. 2, the area where one notch 151 is formed is shown in an enlarged state. FIG. 2 shows components such as the bending area 103, the first inactive area 102 and the second inactive area 104 before execution of a bending process.

In the display panel 100 including the active area 101, the first inactive area 102 disposed to surround the active area 101, the bending area 103 and the second inactive area 104 extending from the bending area 103, two opposite lower corners of the flexible substrate 110 where the first inactive area 102, the bending area 103 and the second inactive area 104 are present are trimmed in inward directions for formation of the notches 151, thereby forming substrate trimming lines as illustrated in FIG. 2. When the area of the substrate bent during a bending process is reduced in association with realization of a slim bezel or a narrow bezel, enhanced processability can be obtained because stress, to which the substrate is subjected, is reduced. In addition, crack stopper structures 126 can be formed inside of the substrate along trimmed surfaces, respectively, in order to avoid propagation of cracks possibly created during a scribing process. Each trimmed surface of the substrate can be formed to have a round corner and, as such, processability and durability can be enhanced.

The GIPs 123, the ESD protection circuits 124, etc. can be disposed at lateral sides of the active area 101 so as to be arranged along a peripheral portion of the VSS line 122. In association with a gate signal, a low-level voltage VSS, a high-level voltage VDD, and external power, which is applied to the pad 135 disposed in the second inactive area 104, can be introduced into the first inactive area 102 after passing through the bending area 103 via the VDD line 121, the data voltage lines 127, and a gate power line 125. In association with a data signal, power applied to the pad 135 disposed in the second inactive area 104 is converted into a data signal, and is then introduced into the active area 101 after passing through the bending area 103 via the data voltage lines 127. Since such various lines extend through the bending area 103, most of the lines can be subjected to tension and shrinkage stresses during execution of a bending process and, as such, can be broken due to stress concentration on specific points thereof. As a result, the display panel 100 can have defects causing malfunction. To this end, it can be important to avoid stress concentration on a specific area of the flexible substrate 110 in order to protect the lines in the bending area 103.

FIG. 3 is a cross-sectional view taken along line I-I' of FIG. 1. For example, FIG. 3 is a cross-sectional view illustrating an example laminated structure of the display panel. For convenience of illustration, the arrays 110, that is, thin film transistor (TFT) arrays, and the light emitting elements 112 are shown in FIG. 3 as being flat. The encapsulation layer 113 can be configured to have a triple-layer structure of inorganic film/organic film/inorganic film. Of course, the encapsulation layer 113 is not limited to the triple-layer structure, and can have a five-layer structure or a multilayer structure including more than five layers. In FIG. 3, the encapsulation layer 113 is shown as a single layer.

In the present disclosure, the encapsulation layer 113 can be disposed over the entirety of the active area 101 and can extend up to the first inactive area 102 surrounding the active area 101, in order to protect the light emitting elements 112 that are susceptible to moisture and dust.

In the present disclosure, the encapsulation layer 113 can have a triple-layer structure of inorganic film/organic film/inorganic film. The inorganic films can be made of an Si-based material such as $SiN_x$, $SiO_x$ or SiON.

The organic film applied to the encapsulation layer 113 can be referred to as a "particle capping layer (PCL)". The organic film can be made of a material such as epoxy resin which is a kind of polymer, without being limited thereto. Each inorganic film can have a multilayer structure of, for example, $SiN_x$/SiON, in place of a single-layer structure. Each inorganic film can have a thickness of about 0.5 to 1 μm. The organic film can have a thickness of 7 to 20 μm. The thicknesses of the organic and inorganic films are not limited to the above-described values.

FIG. 3 illustrates an electrostatic touch structure capable of sensing touch pressure, a force touch structure, or a pen touch structure using touch by a pen. A first adhesive layer 141 and a first touch sensor layer 142 are disposed over the encapsulation layer 113. A second touch sensor layer can further be disposed beneath the flexible substrate 110. As the first touch sensor layer 142, a sensor layer for electrostatic touch can be disposed. As the second touch sensor layer, a sensor layer for force touch or pen touch can be disposed.

Embodiments of the present disclosure are not limited to touch types. Embodiments of the present disclosure can also be applied to a touch-on-encapsulation (TOE) type structure in which an electrostatic touch sensor layer is formed on the encapsulation layer 113 without disposition of the second touch sensor layer.

In the present disclosure, a polarization layer 143 can be disposed on the first touch sensor layer 142. The polarization layer 143 can minimize influence of light generated from an external light source on the light emitting elements 112 in a state of being introduced into the display panel 100. Embodiments of the present disclosure are not limited to the structure of FIG. 3. In the case of a product more sensitive to touch sensitiveness, disposition of the first touch sensor layer 142 and the polarization layer 143 can be reversed.

In the present disclosure, a second adhesive layer 144 and a decorative film 145 can be disposed on the polarization layer 143. A cover window 146 can also be attached to an outer surface of the display panel 100 in order to protect the display panel 100 from external environments.

In the present disclosure, the decorative film 145 is disposed at the top of the display panel 100 in order to hide the first inactive area 102 disposed outside the active area 101 from the view of the user such that the user can view only the active area 101. In this regard, the decorative film 145 can provide enhanced aesthetics. The decorative film 145 can also protect the components disposed in the first inactive area 102 from an external light source.

A first support layer 131 can be disposed at the bottom of the flexible substrate 110 or the lower surface of the flexible substrate 110. The first support layer 131 can have a thickness of, for example, 100 to 125 μm, 50 to 150 μm, 75 to 200 μm, less than 150 μm, or more than 100 μm, without being limited thereto. The first support layer 131 can be made of, for example, polyethylene terephthalate (PET), without being limited thereto. For force touch for sensing touch pressure or electromagnetic sensing type touch for recognizing touch by a pen, a second sensor layer can be disposed beneath the substrate 110.

A layer made of metal can be additionally disposed beneath the first support layer 131. The reason why the metal layer is additionally disposed is as follows. Noise can be generated in batteries or semiconductor chips of modules attached to the display panel 100. Due to such noise, electromagnetic interference (EMI) can be generated in the display panel 100. Such EMI can cause malfunction of the TFTs or OLEDs of the arrays 111 or abnormality of a display screen. In order to avoid such phenomena, the metal layer 138, which has a thickness of about 0.1 mm, is disposed. Thus, an effect of shielding EMI can be provided. An additional metal layer 138 can also be disposed in order to provide a heat dispersion effect capable of dispersing heat generated from a light source of the display panel 100 and a rigidity effect capable of more firmly supporting the flexible substrate 110.

The circuit board 136 and the pad 135 associated therewith can be provided at one end of the flexible substrate 110. When a bending process is executed, the circuit board 136, which is attached to the pad 135, is disposed behind the screen of the active area 101 and, as such, the size of the display panel 100 can be reduced.

Despite being formed on the upper surface of the flexible substrate 110, the driver IC 137, the pad 135 and the circuit board 136 electrically connected to the pad 135 can be disposed at a side opposite to the active area 101 in accordance with bending.

As illustrated in FIG. 3, a microcoating layer 133 can be disposed to protect lines, etc. disposed on a bent portion of the flexible substrate 110. For sufficient protection of the lines, the microcoating layer 133 can be coated over the entirety of the bending area 103 in such a manner that coating of the microcoating layer 133 is begun from the vicinity of the driver IC 137, and is ended at a side wall of the first adhesive layer 141 including the encapsulation layer 113 such that the microcoating layer 133 contacts the side wall of the first adhesive layer 141. In this case, the microcoating layer 133 can contact the first touch sensor layer 142 or can be disposed adjacent to the first touch sensor layer 142 after completion of coating when the microcoating layer 133 is excessively coated in the vicinity of the first adhesive layer 141 or due to surface tension between the first adhesive layer 141 and the microcoating layer 133. The microcoating layer 133 can be coated over an area extending from the vicinity of the driver IC 137 to the side wall of the first adhesive layer 141 via the bending area 103. The microcoating layer 133 can be disposed along the outlines of the notches 151, which are formed to extend over the inactive area 102 and the bending area, as described in conjunction with FIG. 1.

A second support layer 132 can be disposed beneath the second inactive area 104, for the same reason as the first support layer 131 disposed in the active area 101 and the first inactive area 102 to support the flexible substrate 110. In accordance with disposition of the second support layer 132, it can be possible to secure process stability during attachment of the driver IC 137 to be disposed at an upper surface of the second inactive area 104 and the circuit board 136 to be connected to the pad 135.

A guide structure 200 can be disposed beneath the first support layer 131. The guide structure 200 can include a first section 210a, a second section 210b, and a third section 210c disposed between the first section 210a and the second section 210b. The first section 210a is attached to the first support layer 131, thereby enabling the guide structure 200 to be fixed to the lower surface of the display panel 100. The second section 210b is spaced apart from the first section 210a by a distance equal to the height of the third section 210c, and is disposed to partially cover a portion of the flexible substrate 110 180°-folded or bent toward the lower surface of the display panel 100 in accordance with bending. For example, as the second section 210b is disposed to overlap with a portion of the second inactive area 104 or a portion of the circuit board 136, the guide structure 200 can form, between the first section 210a and the second section 210b, a space or gap in which an end of the second inactive area 104 or an end of the circuit board 136 can freely move under the condition that the end is not bonded to the guide structure 200. The free movement distance can be limited by setting, to 50 nm, the distance between the third section 210c of the guide structure 200 and the end of the second inactive area 104 or the distance between the third section 210c and the end of the circuit board 126. However, embodiments of the disclosure are not limited to the above-described distance. The distance can be set to various values.

FIG. 4 is a view illustrating a guide structure according to an embodiment of the present disclosure.

Referring to FIG. 4, the guide structure, which is designated by reference numeral "200", can be constituted by three portions. The guide structure includes a first section 210a attached to the flexible substrate 110, to be supported by the flexible substrate 110, a second section 210b functioning as a cover to cover at least a portion of the flexible substrate 110 or at least a portion of the circuit board 136, and a third section 210c disposed between the first section 210a and the second section 210b such that the first section 210a and the second section 210b are spaced apart from each other by a predetermined distance. The third section 210c closes one surface of the guide structure 200 while having a height h equal to the distance and, as such, can provide a movement range to allow free movement of the flexible substrate 110 or the circuit board 136. For example, a free movement range of the flexible substrate 110 or the circuit board 126 capable of dispersing external stress transferred to the bending area 103 under the condition that a bezel bending state is not released can be provided by structures of the third section 210c and the second section 210b. The distance h can be designed taking into consideration the laminated structure of the flexible substrate 110 and the circuit board 136. The guide structure 200 can be disposed to have the distance h, taking into consideration the radius of curvature R of the display panel 100 and the thickness of the display panel 100. The first section 210a includes a third adhesive layer 220 to enable the first section 210a to be attached to the first support layer 131 disposed beneath the bottom of the flexible substrate 110. The first section 210a can have a y-axis parallel to a shorter axis of the flexible substrate 110, and an x-axis parallel to a longer axis of the flexible substrate 110. When the distance h, the thickness of the first section 210a, the thickness of the second section 210b, and the thickness of the third adhesive layer 220 to enable the first section 210a to the first support layer 131 are summed, it can be possible to determine the height of the guide structure, that is, the z-axis length of the guide structure 100. The z-axis length of the guide structure 200, which is the height of the guide structure 200, can be an important parameter to provide an optimal condition for insertion of the display panel 100 into a module. When the z-axis length of the guide structure 200, that is, the height of the guide structure 200, is excessively great, the bent portion of the flexible substrate 110 can be escaped from the guide structure 200. Furthermore, the module, on which the display panel 100 will be mounted, should have a wider space for receiving the guide structure 200. In this case, a reduction in rigidity can occur due to a change in design of a module mold. On the other hand, when the z-axis length of the guide structure 200, that is, the height of the guide structure 100, is excessively small, for example, when the thickness of the first section 210a and the thickness of the second section 210b are excessively reduced, there can a phenomenon that the guide structure 200 cannot withstand stress generated during repeated free movement of the flexible substrate 110. As illustrated in FIG. 4, the y-axis length of the guide structure 200 can be greater than the x-axis length of the guide structure 200. For example, the y-axis length of the guide structure 200 should be sufficiently great so as to correspond to a portion of the flexible substrate 110 or at least a portion of the circuit board 136, and the x-axis length of the guide structure 200 should be determined to be a length capable of suppressing elastic recovery of the flexible substrate 110 or the circuit board 136 while allowing free movement of the flexible substrate 110 or the circuit board 136. When the guide structure 200 is designed taking into consideration the above-described factors, the y-axis length can be greater than the x-axis length. When the guide structure 200 is designed based on all of the above-described conditions, the x-axis length can be 3 mm, the y-axis length can be 50 mm, the thickness of the first section 210a can be 0.35 mm, the thickness of the second section 210b can be 0.3 mm, the thickness of the third adhesive layer 220 can be 0.05 mm, the distance h can be 0.3 mm, and the summed z-axis thickness of the guide structure 200 can be 1 mm. However, the x-axis length, the y-axis length, the thickness of the first section 210a, the thickness of the second section 210b, the thickness of the adhesive layer 220, and the distance h are not limited to the above-described values. Since the guide structure 200 allows the flexible substrate 110 and the circuit board 136 to move freely therein, friction can be generated due to interference of the flexible substrate 110 and the circuit board 136 with the guide structure 200 during free movement of the flexible substrate 110 and the circuit board 136. Friction generated between the flexible substrate 110 or the circuit board 136 and the guide structure 200 can generate static electricity and heat and, as such, the circuit board 136 can malfunction. In order to avoid such malfunction, a configuration capable of reducing friction possibly generated at the guide structure 200 is applicable to the guide structure 200. The first section 210a, the second section 210b and the third section 210c constituting the guide structure 200 can be made of a material having a low coefficient of skin friction. For example, a material such as self-lubricating polycarbonate (PC), Teflon, or the like can be used. Polycarbonate is an engineering plastic, and has an advantage of high impact strength by virtue of high toughness thereof. In addition, polycarbonate exhibits high heat resistance, excellent low-temperature characteristics, and stability against light. In addition, polycarbonate exhibits low oxidation during molding thereof, and is light. When this material is molded into a product, the surface of the product exhibits high resistance against scratching. In this regard, polycarbonate can be suitable for a structure frequently subjected to friction, thereby exhibiting generation of heat while being susceptible to oxidation. Teflon also has advantages of excellent heat resistance, resistance against chemical substances, non-flammability, non-adhesion, and low coefficient of friction according to non-adhesion. The material used for manufacture of the guide structure 200 is not limited to the above-described materials. Plastic or metal can also be applicable. A method for manufacturing the guide structure 200 can also be taken into consideration in order to prevent a portion of the flexible substrate 110 or the circuit board 136, which is disposed adjacent to the guide structure 200, from coming into contact with an irregular surface of the guide structure 200 such as a protrusion present at a bonding area between the elements of the guide structure 200 during manufacture of the guide structure 200. For example, the guide structure 200 can be manufactured using a method in which the second section 210b and the third section 210c, which will contact the flexible substrate 110 or the circuit board 136, are injection-molded into one mold, the first section is injection-molded into another mold, and the molds are then bonded to each other. In another example, a double injection molding method can be used. In the double injection molding method, an outer portion of the guide structure 200 is formed through primary injection molding, and an inner portion of the guide structure 200 is then formed through secondary injection molding. After manufacture of the guide structure 200 in the form of a mother substrate, laser cutting is performed to separate the mother substrate into unit cells corresponding to individual guide structures 200. A process for bonding each individual guide structure 200 to each display panel 100 can then be executed. In FIGS. 3 and 4, the first section 210a and the second section 210b are shown to be parallel arranged. In other embodiments, the first section 210a and the second section 210b can be angled either towards each other or away from each other relative to the third section 210C so that the first section 210a and the second section 210b can be not parallel.

FIGS. 5A and 5B are a bottom plan view of a display panel according to an embodiment of the present disclosure and a view illustrating a guide structure of the display panel, respectively.

FIG. 5A shows a bottom plan view of a display panel 100 according to the illustrated embodiment of the present disclosure to which a guide structure 200 is applied. FIG. 5A shows the cover window 146 and the first support layer 131 attached to the lower surface of the flexible substrate 110. FIG. 5A also shows the microcoating layer 133 disposed in the bending area 103 subjected to a bezel bending process, and the second inactive area 104. In addition, FIG. 5A shows a state in which a portion of the second inactive area 104 is inserted into an inner space of the guide structure 200. That is, FIG. 5A shows a state of the display panel 100 before attachment thereof to a module. Since FIG. 5A is a bottom plan view of the display panel 100, only the second section 210b, among the portions of the guide structure 200, is shown in FIG. 5A.

FIG. 5B is a three-dimensional view of the guide structure 200. FIG. 5B shows the first section 210a, the second section 210b, the third section 210c, and the third adhesive layer 220 for attaching the first section 210a to the first support layer 131. The direction indicated by "a→a'" in FIG. 5B is identical to the direction indicated by "a→a'" in FIG. 5A. A portion of the second inactive area 104 in the bent flexible substrate 110 and the circuit board 136 can be disposed between the first section 210a and the second section 210b in the guide structure 200 illustrated in FIG. 5B. When viewed with reference to, for example, the circuit board 136, at least a portion of the circuit board 136 can be disposed between the first section 210a and the second section 210b in the guide structure 200, and an end of the circuit board 136 can be spaced apart from the third section 210c by a certain distance. The circuit board 136 is disposed in a non-fixing or non-adhesion state with respect to the guide structure 200 and, as such, can have free movability. For example, the circuit board 136 can be disposed such that the distance allowing the end of the circuit board 136 disposed within the guide structure 200 to move freely to the third section 210c of the guide structure 200 is about 50 µm. However, the free movement distance is not limited to the illustrated embodiment. Referring to FIG. 5B, the guide structure 200 is open at opposite lateral portions thereof where the third section 210c is not disposed. The circuit board 136 can be electrically connected to an external power source through the open lateral portions of the guide structure 200.

FIGS. 6A and 6B are a bottom plan view of a display panel according to another embodiment of the present disclosure and a view illustrating a guide structure of the display panel, respectively.

FIG. 6A shows a bottom plan view of a display panel 100 according to the illustrated embodiment of the present disclosure in which a guide structure 200 is disposed. Referring to FIG. 6A, an opening having a rectangular shape is formed at the second section 210b, and an upper surface of the circuit board 136 is partially exposed through the opening. FIG. 6A shows the cover window 146 and the first support layer 131 attached to the lower surface of the flexible substrate 110. FIG. 6A also shows the microcoating layer 133 disposed in the bending area 103 subjected to a bezel bending process for the flexible substrate 110, the second inactive area 104, and the circuit board 136 connected to the pad 135. FIG. 6B is a three-dimensional view of the guide structure 200. Referring to FIG. 6B, the guide structure 200 includes the first section 210a, the second section 210b, the third section 210c, and the third adhesive layer 220 formed to attach the first section 210a to the first support layer 131. The direction indicated by "b→b'" in FIG. 6B is identical to the direction indicated by "b→b'" in FIG. 6A. A portion of the second inactive area 104 in the flexible substrate 110 and the circuit board 136 can be disposed in a non-fixing or non-adhesion state between the first section 210a and the second section 210b. An end of the circuit board 136 can be spaced apart from the third section 210c by a certain distance. For example, the circuit board 136 can be disposed such that the distance allowing the end of the circuit board 136 disposed within the guide structure 200 to move freely to the third section 210c of the guide structure 200 is about 50 µm. However, the free movement distance is not limited to the illustrated embodiment. As illustrated in FIG. 6B, the opening can be formed at the second section 210b of the guide structure 200 and, as such, the circuit board 136 can be exposed through the opening. The guide structure 200 of FIG. 6B can allow connection of the circuit board 136 to the external power source through not only the open lateral portions thereof, but also the opening of the second section 210b.

FIGS. 7A and 7B are a bottom plan view of a display panel according to another embodiment of the present disclosure and a view illustrating a guide structure of the display panel, respectively.

FIG. 7A shows a bottom plan view of a display panel 100 according to the illustrated embodiment of the present disclosure to which a guide structure 200 is applied. Referring to FIG. 7A, the display panel 100 can include the cover window 146, the first support layer 131, the microcoating layer 133, the second inactive area 104, and the circuit board 136. In the embodiment of the present disclosure illustrated in FIGS. 7A and 7B, the second section 210b of the guide structure 200 has a "U"-shaped cross-section or plane open at a portion thereof facing an end of the circuit board 136. FIG. 7B is a three-dimensional view of the guide structure 200. FIG. 7B shows the first section 210a, the second section 210b, the third section 210c, and the third adhesive layer 220 for attaching the first section 210a to the first support layer 131. The third section 210c includes two portions so as to correspond to the open portion of the second section 210b. The direction indicated by "c→c'" in FIG. 7B is identical to the direction indicated by "c→c'" in FIG. 7A. In a state in which a portion of the second inactive area 104 in the flexible substrate 110 and a portion of the circuit board 136 are covered by the second section 210b of the guide structure 200, the end of the circuit board 136 is partially exposed between the two portions of the third section 210c while being partially hidden by the third section 210c. Accordingly, the free movement range of the circuit board 136 can be set by the third section 210c. A portion of the second inactive area 104 in the flexible substrate 110 and the circuit board 136 can be disposed in a non-fixing or non-adhesion state between the first section 210a and the second section 210b. The end of the circuit board 136 can be spaced apart from the third section 210c by a certain distance. For example, the circuit board 136 can be disposed such that the distance allowing the end of the circuit board 136 disposed within the guide structure 200 to move freely to the third section 210c of the guide structure 200 is about 50 µm. However, the free movement distance is not limited to the illustrated embodiment. The circuit board 136 can be connected to the external power source at an exposed upper surface thereof or the exposed end thereof. In each of the above-described embodiments, the guide structure 200 is disposed to be spaced apart from the end of the circuit board 136 by a predetermined distance, as described with reference to FIGS. 5A and 5B, FIGS. 6A and 6B, or FIGS. 7A and 7B, and, as such, the end of the circuit board 136 moves freely within the guide structure 200 when free movement of the bending area 103 occurs, thereby being capable of dispersing stress.

FIGS. 8A and 8B are a bottom plan view of a display panel according to another embodiment of the present disclosure and a view illustrating a guide structure of the display panel, respectively.

Referring to FIG. 8A, the display panel 100 according to the illustrated embodiment of the present disclosure can include the cover window 146, the first support layer 131, the microcoating layer 133, the second inactive area 104, the circuit board 136, and the guide structure 200. The second section 210b of the guide structure 200 can be disposed to have a "U"-shaped cross-section or plane. The second section 210b of the guide structure 200 illustrated in FIG. 8A or 8B can allow the circuit board 136 to extend through an opening of the U-shaped second section 210b such that the circuit board 136 faces the first support layer 131. Accordingly, the guide structure 200 including the second section 210b and the third section 210c, which have opening widths allowing passage of the circuit board 136 therethrough, respectively, is disposed in the vicinity of an end of the flexible substrate 110 while being spaced apart from the end of the flexible substrate 110 by a predetermined distance in a direction d'. Free movability of the second inactive area 104 of the flexible substrate 110 can be limited by disposition of the second section 210b and the third section 210c in the flexible substrate 110. The second inactive area 104 of the flexible substrate 110 is disposed in a non-fixing or non-adhesion state between the first section 210a and the second section 210b. The circuit board 136 can extend to pass through the second section 210b and the third section 210c, and the end of the second inactive area 104 can be spaced apart from the third section 210c. For example, the second inactive area 104 of the flexible substrate 110 can be disposed such that the distance allowing the end of the second inactive area 104 disposed within the guide structure 200 to move freely to the third section 210c of the guide structure 200 is about 50 μm. However, the free movement distance is not limited to the illustrated embodiment. When it is taken into consideration that the flexible substrate 110 exhibits high rigidity or durability, as compared to the circuit board 136, and defects can occur due to process deviation generated during attachment of the circuit board 136 to the pad 135. The guide structure 200 configured to guide the flexible substrate 110 and provide securing correct disposition of the guide structure 200. For example, accuracy of the distance between the guide structure 200 and the flexible substrate can provide the circuit board 136 to be spaced apart from the guide structure 200. Thus, the defects during the process of the attaching the circuit board 136 to the pad 135 can be controlled.

Figure 9C:
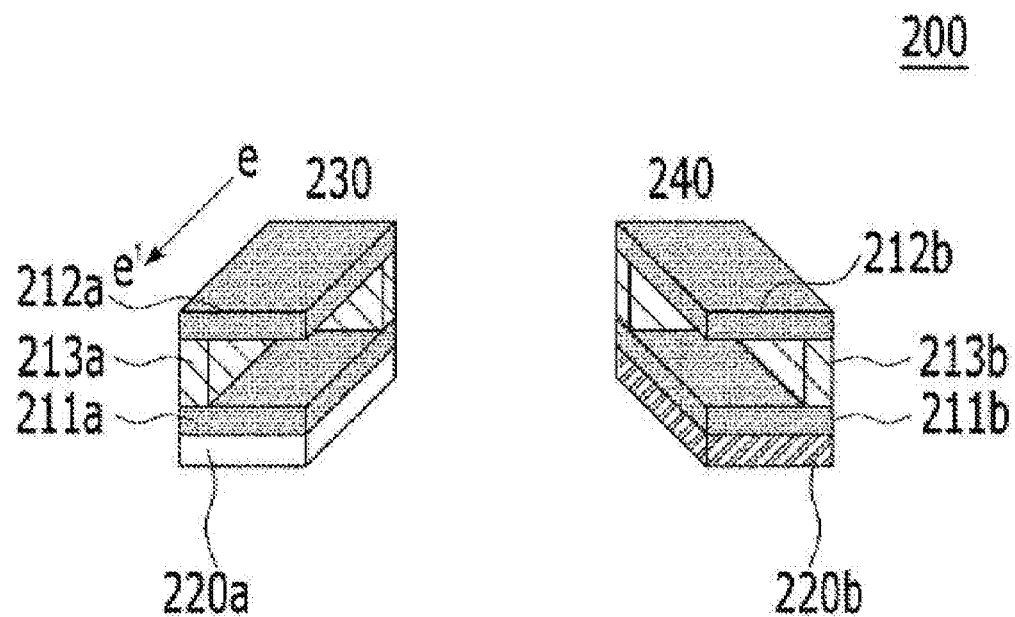
FIG. 9C is a view illustrating a guide structure of FIG. 9A.

FIGS. 9A and 9B are a bottom plan view and a side view illustrating a display panel according to another embodiment of the present disclosure, respectively. FIG. 9C is a view illustrating a guide structure of the display panel.

Referring to FIG. 9A, the display panel 100 according to the illustrated embodiment of the present disclosure can include the cover window 146, the first support layer 131, the microcoating layer 133, the second inactive area 104, the circuit board 136, and the guide structure 200. In the illustrated embodiment of the present disclosure, the guide structure 200 can be disposed at the display panel 100 under the condition that the guide structure 200 is divided into a left guide 230 and a right guide 240. As the guide structure 200 is divided into the left guide 230 and the right guide 240, the second inactive area 104 of the bent flexible substrate 110 and the circuit board 136 can be disposed in a non-fixing or non-adhesion state between the left guide 230 and the right guide 240, and the free movement distance or range of an end of the second inactive area 104 can be limited by the left guide 230 and the right guide 240.

The arrow A in FIG. 9A represents a viewing direction in which the display panel 100 is viewed. FIG. 9B shows the display panel 100 viewed in the viewing direction. Referring to FIG. 9B, the cover window 146, the microcoating layer 133 disposed in the bending area 103, and the second active area 104 can be disposed at the lower surface of the display panel. Side surfaces of the second active area 104 and an end of the second active area 104 are disposed to be spaced apart from the left guide 230 and the right guide 240 by predetermined distances, respectively. The circuit board 136 can be disposed on an upper surface of the second inactive area 104.

FIG. 9C is a three-dimensional view of the guide structure 200 divided into the left guide 230 and the right guide 240. The left guide 230 includes a fourth adhesive layer 220a, a first section 211a, a second section 212a, and a third section 213a. The third section 213a forms one or two side walls of the left guide 230 in order to simultaneously limit free movement of the end of the second inactive area 104 in the flexible substrate 110 or free movement of both the end of the second inactive area 104 and a side surface of the second inactive area 104. The right guide 240 includes a fifth adhesive layer 220b, a fourth section 211b, a fifth section 212b, and a sixth section 213b. The sixth section 213b forms one or two side walls of the right guide 240 in order to simultaneously limit free movement of the end of the second inactive area 104 in the flexible substrate 110 or free movement of both the end of the second inactive area 104 and a side surface of the second inactive area 104. The direction indicated by "e→e'" in FIG. 9C is identical to the direction indicated by "e→e'" in FIG. 9A. As compared to the integrated guide structures 200 in the previous embodiments, the guide structure 200 divided into the left guide 230 and the right guide 240 has advantages in that the guide structure 200 requires a reduced amount of the material thereof, can be easily manufactured, and can optimize guide for the second inactive area 104 of the flexible substrate 110 to appropriately limit free movement of the flexible substrate 110, thereby minimizing stress possibly generated during movement of the flexible substrate 110. Position deviation of the left guide 230 and the right guide 240 should be accurately controlled during execution of a process for attaching the left guide 230 and the right guide 240 to the first support layer 131 of the display panel 100, in order to avoid defects such as distortion of the flexible substrate 110.

FIGS. 10A and 10B are a bottom plan view of a display panel according to another embodiment of the present disclosure and a view illustrating a guide structure of the display panel, respectively.

Referring to FIG. 10A, the display panel 100 according to the illustrated embodiment of the present disclosure can include the cover window 146, the first support layer 131, the microcoating layer 133, the second inactive area 104, the circuit board 136, and the guide structure 200. The guide structure 200 of the illustrated embodiment of the present disclosure includes a first section 211a and a fourth section 211b, which limit free movement of side surfaces of the second inactive area 104 in the flexible substrate 110, respectively, and a bar-shaped seventh section 215 for limiting vertical (z-axis) free movement of the second active area 104 and the circuit board 136. In this case, an end of the flexible substrate 110 is disposed in a non-fixing or non-adhesion state while maintaining a bezel-bending state. The guide structure 200 can limit vertical free movement ranges of the second inactive area 104 and the circuit board 136. Vertical extensions can be additionally provided at ends of the first and fourth sections 211*a* and 211*b*, respectively, to further limit free movement of the end of the flexible substrate 110. As compared to the guide structures 200 in the previous embodiments, the guide structure 200 can be easily manufactured by virtue of a simple structure thereof, and can secure accuracy when the guide structure 200 is attached to the first support layer 131. Since the bar-shaped seventh section 215 of the guide structure 200 is manufactured to have a bar shape, it can be possible to maintain the bezel-bending state of the flexible substrate 110 while minimizing the area of the guide structure 200 contacting the second inactive area of the flexible substrate 110.

FIGS. 11A and 11B are cross-sectional views of guide structures according to other embodiments of the present disclosure, respectively.

The illustrated embodiment of the present disclosure not only provides a configuration capable of allowing an end of the flexible substrate 110 or an end of the circuit board 136 to move freely under the condition that the end of the flexible substrate 110 or the end of the circuit board 136 is spaced apart from the third section 210*c* of the guide structure 200 by a predetermined distance, but also provides a configuration capable of reducing impact possibly applied to the flexible substrate 110 and the circuit board 136 when the end of the flexible substrate 110 or the end of the circuit board 136 comes into contact with a hard object, that is, the third section 210*c*. As described in the embodiment of the present disclosure with reference to FIG. 4, the guide structure 200 is a construction allowing free movement of the flexible substrate 110 and the circuit board 136 therethrough and, as such, the flexible substrate 110 and the circuit board 136 can be subjected to impact due to interference thereof with the guide structure 200 during free movement thereof. When the flexible substrate 110 or the circuit board 136 strikes or comes into contact with the third section 211*c* of the guide structure 200 during free movement thereof occurring due to external stress after completion of a bezel bending process, impact can be transferred to the flexible substrate 110 or the circuit board 136 and, as such, defects such as deformation of the flexible substrate 110 or the circuit board 136 can occur. In order to avoid defects such as deformation of the flexible substrate 110 or the circuit board 136, an impact absorbing member capable of absorbing impact can be disposed at the third section 210*c* of the guide structure 200. The guide structure 200 illustrated in FIG. 11A can include the first section 210*a*, the second section 210*b*, and the third section 210*c*. A first impact absorbing member 250*a* can be disposed at the third section 210*c*. When the end of the flexible substrate 110 or the end of the circuit board 136 strikes or comes into contact with the first impact absorbing member 250*a* while moving freely, the first impact absorbing member 250*a* can absorb impact generated during free movement of the end of the flexible substrate 110 or the end of the circuit board 136 by virtue of elastic force exhibited, in accordance with, for example, shrinkage and release of a plate spring. For example, the first impact absorbing member 250*a* can take the form of a plate spring, without being limited thereto. The plate spring can be made of, for example, metal or plastic. The material of the plate spring as the first impact absorbing member is not limited to the illustrated embodiment. Other materials can be applied.

The guide structure 200 illustrated in FIG. 11B can include the first section 210*a*, the second section 210*b*, and the third section 210*c*. A second impact absorbing member 250*b* having a rectangular cross-sectional shape can be disposed at the third section 210*c*. When the end of the flexible substrate 110 or the end of the circuit board 136 strikes or comes into contact with the second impact absorbing member 250*b* while moving freely, the second impact absorbing member 250*b* can absorb impact generated during free movement of the end of the flexible substrate 110 or the end of the circuit board 136 by virtue of elastic force exhibited in accordance with, for example, shrinkage and release of a high elasticity body. For example, the second impact absorbing member 250*b* can be made of a material such as a urethane foam or a silicone resin. The urethane foam is a material having the form of a pad made of a foaming agent such as polyurethane, and has advantages of excellent abrasion resistance and excellent elastic recovery. The silicone resin is a polysiloxane-based compound, and has advantages in that the silicone resin can exhibit no or little reaction by virtue of chemical stability thereof, and can be formed into not only a soft product, but also a hard product. The first impact absorbing member 250*a* and the second impact absorbing member 250*b* can be applied to all embodiments of the present disclosure.

The display apparatus according to each embodiment of the present disclosure can include a liquid crystal display (LCD) apparatus, a field emission display (FED) apparatus, an organic light emitting display (OLED) apparatus, and a quantum dot (QD) display apparatus.

The display apparatus according to each embodiment of the present disclosure can include equipment apparatuses including complete products or final products of LCM and OLED modules, for example, a notebook computer, a television, a computer monitor, an automotive apparatus, or other type apparatuses for vehicles, and set electronic apparatuses or set apparatuses such as mobile electronic apparatuses, for example, a smart phone and a tablet.

The display apparatus according to each embodiment of the present disclosure can be explained as follows.

The display apparatus according to an embodiment of the present disclosure a flexible substrate including an active area and an inactive area, the inactive area including a first area disposed adjacent to the active area, a second area where a circuit board is disposed, and a bending area disposed between the first area and the second area, a first support layer disposed beneath the active area and the first area, and a second support layer disposed beneath the second area, and a guide disposed at a lower surface of the flexible substrate, the guide including a first section and a second section, wherein the first section is bonded to a lower surface of the first support layer, and the second section is disposed to cover a portion of the substrate bent by or that extends from the bending area.

In accordance with an embodiment of the present disclosure, the guide can be disposed to cover the second support layer and at least a portion of the circuit board.

In accordance with an embodiment of the present disclosure, the guide can further include a third section disposed between the first section and the second section.

In accordance with an embodiment of the present disclosure, the second section and the third section need not be bonded to the flexible substrate and the circuit board.

In accordance with an embodiment of the present disclosure, the third section can have a height greater than a sum of thicknesses of the flexible substrate and the circuit board such that a gap is formed between the first section and the second section.

In accordance with an embodiment of the present disclosure, each of the first and second sections can have a y-axis parallel to a shorter axis of the flexible substrate, and an x-axis parallel to a longer axis of the flexible substrate.

In accordance with an embodiment of the present disclosure, the y-axis can have a greater length than the x-axis.

In accordance with an embodiment of the present disclosure, an opening can be disposed at the second section, to allow the circuit board to be connected to an external power source.

In accordance with an embodiment of the present disclosure, the guide can further include an impact absorbing member disposed at a portion of the third section.

In accordance with an embodiment of the present disclosure, the impact absorbing member can take the form of a plate spring.

The flexible display apparatus according to another embodiment of the present disclosure can include a substrate comprising a display area and a non-display area, a component formation part disposed at a portion of the non-display area, a first support layer disposed at a lower surface of the display area, a circuit board disposed at one surface of the component formation part, and a structure bonded to one surface of the first support layer while being disposed to cover at least a portion of the component formation part, the structure supporting the substrate in a non-fixing state.

In accordance with an embodiment of the present disclosure, the structure can include a first section attached to the surface of the first support layer, a second section disposed to cover at least a portion of the circuit board, and a third section disposed between the first section and the second section.

In accordance with an embodiment of the present disclosure, the structure can include a first guide and a second guide, and each of the first and second guides can include a first section bonded to the surface of the first support layer.

In accordance with an embodiment of the present disclosure, the flexible display can further include a second support layer disposed at a lower surface of the component formation part. The first guide and the second guide can be disposed to overlap with at least a portion of the second support layer.

In accordance with an embodiment of the present disclosure, the second section and the third section can be disposed to be spaced apart from the component formation part and the circuit board.

In accordance with an embodiment of the present disclosure, the third section can have a height greater than a sum of thicknesses of the component formation part and the circuit board such that a gap is formed between the first section and the second section.

In accordance with an embodiment of the present disclosure, the structure can have a y-axis parallel to a shorter axis of the substrate, and an x-axis parallel to a longer axis of the substrate.

In accordance with an embodiment of the present disclosure, the second section can be provided with an opening at an upper portion thereof, to allow the circuit board to be connected to an external power source.

In accordance with an embodiment of the present disclosure, the structure can further include an impact absorbing member disposed at the third section.

In accordance with an embodiment of the present disclosure, the impact absorbing member can be made of polyurethane or silicone.

In the display apparatus according to each embodiment of the present disclosure, the inactive area of the display panel, which is a non-display area, is bent at the entirety thereof or a portion thereof to have a predetermined radius of curvature, through application of a flexible substrate, such that the inactive area is disposed beneath the active area. Accordingly, it can be possible to provide a display apparatus in which a display panel thereof has an outer appearance having a slim bezel or a narrow bezel.

In the display apparatus according to each embodiment of the present disclosure, when the inactive area of the display panel, which is a non-display area, is bent at the entirety thereof or a portion thereof to have a predetermined radius of curvature, a space having a predetermined width is defined between portions of the flexible substrate facing after bending of the flexible substrate. In this case, a coating layer is disposed on the component formation part in order to protect components such as various lines disposed in the bending area of the substrate. Accordingly, it can be possible to reduce external impact possibly applied to the display panel before/after execution of a manufacturing process for the display panel and tension stress and shrinkage stress, to which the components disposed at the flexible substrate are possibly subjected during a bending process, and, as such, short circuit or breakage of the components can be prevented. Accordingly, a more stable display apparatus can be provided. Even when impact is applied to the display apparatus due to carelessness of the user, abnormality of a bent portion of the display apparatus can be prevented.

In the display apparatus according to each embodiment of the present disclosure, the first support layer is additionally disposed beneath the active area and the inactive area of the flexible substrate, and the second support layer is additionally disposed in the area facing the active area after bending of the flexible substrate. Accordingly, it can be possible to protect the light emitting elements, the circuits for driving of the light emitting elements, and other components disposed within the display panel from various distortion and strain, to which the flexible substrate made of a flexible material is possibly subjected during manufacture of the display panel.

Effects of the present disclosure are not limited to the above-described effects. Other effects not described in the present disclosure can be readily understood by those skilled in the art through the following description.

It will be apparent to those skilled in the art that various modifications and variations can be made in the present disclosure without departing from the spirit or scope of the disclosure. Thus, it is intended that the present disclosure cover the modifications and variations of the present disclosure provided they come within the scope of the appended claims and their equivalents.

What is claimed is:

1. A flexible display apparatus comprising:
a flexible substrate comprising an active area and an inactive area, the inactive area comprising a first area disposed adjacent to the active area, a second area where a circuit board is disposed, and a bending area disposed between the first area and the second area;
a first support layer disposed below the active area and the first area, and a second support layer disposed below the second area; and
a guide disposed at a lower surface of the flexible substrate, the guide comprising a first section and a second section, wherein the first section of the guide is disposed on a lower surface of the first support layer, and the second section is disposed to cover a portion of the substrate that extends from the bending area.

2. The flexible display apparatus according to claim 1, wherein the guide is disposed to cover and receive the second support layer and at least a portion of the circuit board.

3. The flexible display apparatus according to claim 1, wherein the guide further comprises a third section disposed between the first section and the second section.

4. The flexible display apparatus according to claim 3, wherein the second section and the third section are not bonded to the flexible substrate and the circuit board.

5. The flexible display apparatus according to claim 4, wherein the third section has a height greater than a sum of thicknesses of the flexible substrate and the circuit board so that a gap is provided between the first section and the second section.

6. The flexible display apparatus according to claim 1, wherein each of the first and second sections has a y-axis parallel to a shorter axis of the flexible substrate, and an x-axis parallel to a longer axis of the flexible substrate.

7. The flexible display apparatus according to claim 6, wherein the y-axis has a greater length than the x-axis.

8. The flexible display apparatus according to claim 1, wherein an opening is disposed at the second section, to allow the circuit board to be connected to an external power source.

9. The flexible display apparatus according to claim 3, wherein the guide further comprises an impact absorbing member disposed at a portion of the third section of the guide.

10. The flexible display apparatus according to claim 9, wherein the impact absorbing member has a form of a plate spring.

11. A flexible display apparatus comprising:
   a substrate comprising a display area and a non-display area;
   a component formation part disposed at a portion of the non-display area;
   a first support layer disposed at a lower surface of the display area;
   a circuit board disposed at a surface of the component formation part; and
   a structure bonded to a surface of the first support layer while being disposed to cover at least a portion of the component formation part, the structure supporting the substrate in a non-fixing state.

12. The flexible display apparatus according to claim 11, wherein the structure comprises:
   a first section attached to the surface of the first support layer,
   a second section disposed to cover and receive at least a portion of the circuit board, and
   a third section disposed between the first section and the second section.

13. The flexible display apparatus according to claim 11, wherein the structure comprises a first guide and a second guide, and each of the first and second guides comprises a first section bonded to the surface of the first support layer.

14. The flexible display apparatus according to claim 13, further comprising:
   a second support layer disposed at a lower surface of the component formation part,
   wherein the first guide and the second guide are disposed to overlap with at least a portion of the second support layer.

15. The flexible display apparatus according to claim 12, wherein the second section and the third section are disposed to be spaced apart from the component formation part and the circuit board.

16. The flexible display apparatus according to claim 12, wherein the third section has a height greater than a sum of thicknesses of the component formation part and the circuit board so that a gap is provided between the first section and the second section.

17. The flexible display apparatus according to claim 12, wherein the structure has a y-axis parallel to a shorter axis of the substrate, and an x-axis parallel to a longer axis of the substrate.

18. The flexible display apparatus according to claim 12, wherein the second section of the structure is provided with an opening at an upper portion thereof, to allow the circuit board to be connected to an external power source.

19. The flexible display apparatus according to claim 12, wherein the structure further comprises an impact absorbing member disposed at the third section of the structure.

20. The flexible display apparatus according to claim 19, wherein the impact absorbing member is made of polyurethane or silicone.

* * * * *